(12) United States Patent
Mikawa

(10) Patent No.: US 9,151,239 B2
(45) Date of Patent: Oct. 6, 2015

(54) CONTROL DEVICE AND METHOD FOR CONTROLLING VARIABLE VALVE TIMING MECHANISM IN INTERNAL COMBUSTION ENGINE

(75) Inventor: Kentaro Mikawa, Isesaki (JP)

(73) Assignee: HITACHI AUTOMOTIVE SYTEMS, LTD., Hitachinaka-Shi (JP)

( * ) Notice: Subject to any disclaimer, the term of this patent is extended or adjusted under 35 U.S.C. 154(b) by 448 days.

(21) Appl. No.: 13/615,733

(22) Filed: Sep. 14, 2012

(65) Prior Publication Data

US 2013/0080027 A1 Mar. 28, 2013

(30) Foreign Application Priority Data

Sep. 28, 2011 (JP) ................................ 2011-212730

(51) Int. Cl.
F02D 41/00 (2006.01)
F02D 13/02 (2006.01)
F02N 19/00 (2010.01)
F01L 1/344 (2006.01)
F01L 1/352 (2006.01)

(52) U.S. Cl.
CPC .......... F02D 41/009 (2013.01); F02D 13/0238 (2013.01); F02N 19/004 (2013.01); F01L 1/344 (2013.01); F01L 1/352 (2013.01); F01L 2820/032 (2013.01);
(Continued)

(58) Field of Classification Search
CPC . F02D 2041/001; F02D 41/008; F02D 41/18; F02D 41/401; F02D 41/402; F02D 2200/0402; F02D 2200/0406; F02D 35/02; F02D 13/0238; B60W 10/06; F01L 2013/10; F01L 2013/11; F01L 2013/111; F01L 2013/113; F01L 2013/118; F01L 1/344

USPC ................ 701/102, 105; 123/406.18, 185.13, 123/90.16, 90.15, 90.17
See application file for complete search history.

(56) References Cited

U.S. PATENT DOCUMENTS 3,978,829 A * 9/1976 Takahashi et al. ......... 123/90.15
4,305,352 A * 12/1981 Oshima et al. ............ 123/90.15
(Continued)

FOREIGN PATENT DOCUMENTS

JP 2000-303865 10/2000
JP 2001-165951 6/2001
(Continued)

OTHER PUBLICATIONS

Japanese Patent Office Communication dated Sep. 3, 2013, in Application No. 2011-212730 with its partial English translation.

*Primary Examiner* — Stephen K Cronin
*Assistant Examiner* — Susan E Scharpf
(74) *Attorney, Agent, or Firm* — Foley & Lardner LLP

(57) ABSTRACT

Valve timing is held to a position close to a target value as much as possible while suppressing control errors of valve timing even though a crankshaft rotates in reverse. In an internal combustion engine which controls the valve timing by a variable valve timing mechanism (an electric VTC) driven by an electric motor, an intake valve timing is controlled after an output of an engine stop command such that: when the engine rotates in a forward direction, a real valve timing (a VTC real angle θr) detected by a sensor is converged to a target valve timing (a VTC target angle θtrg) advanced for the time of start; and when the engine rotates in a reverse direction, a manipulated variable of the electric VTC is set so that the VTC real angle θr is held to the VTC real angle θr detected just before the detection of the reverse rotation.

19 Claims, 18 Drawing Sheets

(52) U.S. Cl.
CPC .. *F02D 2041/0095* (2013.01); *F02N 2019/008* (2013.01); *Y02T 10/142* (2013.01); *Y02T 10/18* (2013.01); *Y02T 10/42* (2013.01)

(56) References Cited

U.S. PATENT DOCUMENTS

| | | | | |
|---|---|---|---|---|
| 7,441,524 | B2 * | 10/2008 | Okamoto et al. | 123/90.17 |
| 2008/0167789 | A1 * | 7/2008 | Okamoto et al. | 701/105 |
| 2010/0131180 | A1 * | 5/2010 | Hattori et al. | 701/105 |
| 2010/0241302 | A1 * | 9/2010 | Shimizu | 701/29 |
| 2013/0068185 | A1 * | 3/2013 | Mikawa | 123/90.17 |

FOREIGN PATENT DOCUMENTS

| | | |
|---|---|---|
| JP | 2002-357136 | 12/2002 |
| JP | 2004-162706 | 6/2004 |
| JP | 2004-257249 | 9/2004 |
| JP | 2009-533592 | 9/2009 |
| JP | 2011-132808 | 7/2011 |

* cited by examiner

DURING
MIRROR CYCLE
OPERATION

DURING STARTING

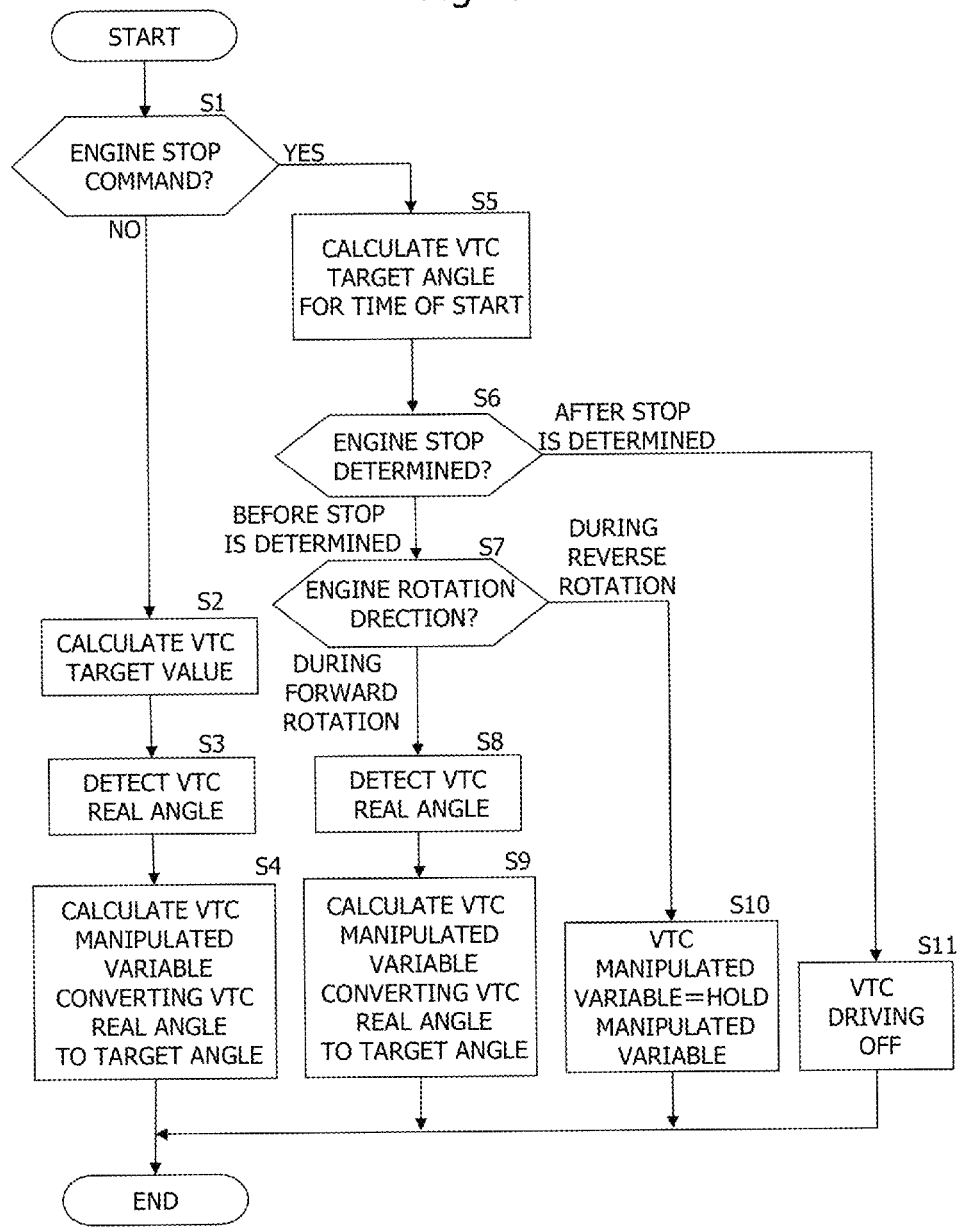

CONTROL DEVICE AND METHOD FOR CONTROLLING VARIABLE VALVE TIMING MECHANISM IN INTERNAL COMBUSTION ENGINE

BACKGROUND OF THE INVENTION

1. Field of the Invention

The present invention relates to a control device and a method for controlling a variable valve timing mechanism which varies valve timing of an engine valve (an intake valve or an exhaust value) of an internal combustion engine.

2. Description of Related Art

A control device of this type of variable valve timing mechanism controls a valve timing by detecting the rotation phase of a camshaft with respect to a crankshaft and bringing the rotation phase close to a target rotation phase by using the variable valve timing mechanism.

However, the crankshaft may rotate in a reverse direction to a forward rotation direction (reverse rotation) at a time of extremely low rotation of an engine just before a stopping, such as when operation of the engine is stopped. In a technique disclosed in Japanese Laid-Open Patent Publication 2000-303865, since the rotation phase of a camshaft cannot be correctly detected when reverse rotation is detected, feedback control to the target phase is stopped and an intake camshaft is driven to rotate to a reference rotation angle position (a default position) where an intake camshaft impacts a stopper in the retard angle direction by a variable valve timing mechanism until the engine is stopped.

However, since the closing timing of the intake valve (IVC) moves away from the dead center of the intake bottom, the effective stroke decreases, the intake air amount decreases and thereby the startability during the next startup decreases at the reference rotation angle position retarded in angle as described above.

SUMMARY OF THE INVENTION

Therefore, in view of the problems of the related art, an object of the present invention is to provide a control device and a method for controlling a variable valve timing mechanism in which a valve timing of an engine valve is brought close to a target value as much as possible while suppressing control errors thereof, and thereby enabling engine drive performance, such as startability, to be preferably maintained even though the crankshaft reversely rotates.

In order to achieve the object described above, a control device of a variable valve timing mechanism in an internal combustion engine according to an aspect of the invention, includes: a crank angle sensor which detects a rotation angle of a crankshaft; a cam sensor which detects a rotation angle of a camshaft for opening and closing an engine valve; a rotation phase detection unit which detects a rotation phase of the camshaft with respect to the crankshaft based on each signal from the crank angle sensor and the cam sensor; and an actuator which relatively rotates the camshaft with respect to the crankshaft and then is able to change the rotation phase, and further includes: a forward rotation and reverse rotation detection unit which determines and detects the forward rotation and the reverse rotation of the crankshaft; and a control unit which controls drive of the actuator and converts a manipulated variable of the actuator into a hold manipulated variable where the rotation phase is controlled to hold its current condition when the reverse rotation of the crankshaft is detected.

In addition, a method for controlling a variable valve timing mechanism in an internal combustion engine according to an aspect of the present invention includes: the steps of: detecting a rotation angle of a crankshaft and a rotation angle of a camshaft for opening and closing an engine valve; detecting a rotation phase of the camshaft with respect to the crankshaft based on each signal of the rotation angle of the crankshaft and the rotation angle of the camshaft for opening and closing the engine valve; and changing the rotation phase of the camshaft by driving an actuator and relatively rotating the camshaft with respect to the crankshaft, and further includes the steps of: determining and detecting the forward rotation and the reverse rotation of the crankshaft; and controlling drive of the actuator to convert a manipulated variable of the actuator into a hold manipulated variable where the rotation phase is controlled to hold its current condition when the reverse rotation of the crankshaft is detected.

The other objects and features of this invention will become understood from the following description with reference to the accompanying drawing.

BRIEF DESCRIPTION OF THE DRAWINGS

FIG. 12A illustrates valve timing at the time of mirror cycle operation after starting and FIG. 12B illustrates valve timing at the time of starting;

FIG. 13 is a flowchart of a first embodiment of valve timing control of an intake valve by the variable valve timing mechanism.

DESCRIPTION OF THE PREFERRED EMBODIMENTS

Hereinafter, an embodiment of the present invention is described with reference to the drawings.

Figure 1:
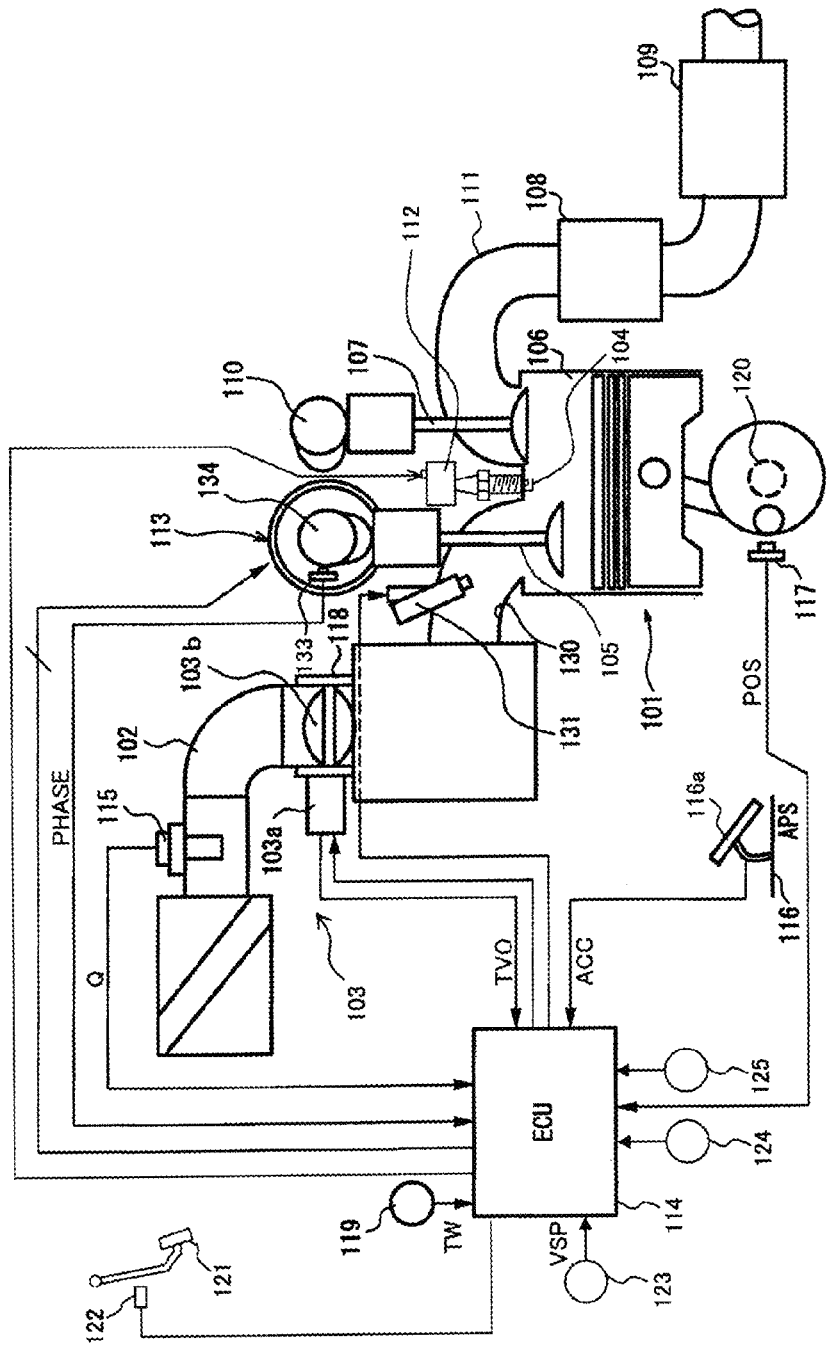
FIG. 1 is a system configuration view illustrating an internal combustion engine in an embodiment of the invention.

FIG. 1 is a configuration view of an internal combustion engine 101 for a vehicle to which a control device of an embodiment of the present invention is applied. In addition, internal combustion engine 101 is a four cycle engine with four in-line cylinders in the embodiment, however, the present invention is not limited to the example.

An electronic control throttle 103, which opens and closes a throttle valve 103b with a throttle motor 103a, is provided in an intake pipe 102 of internal combustion engine 101 in FIG. 1.

Thus, internal combustion engine 101 intakes air inside a combustion chamber 106 of each cylinder via electronic control throttle 103 and an intake valve 105.

An intake port 130 of each cylinder is provided with a fuel injection valve 131. Fuel injection valve 131 opens in response to an injection pulse signal from an ECU (an engine control unit) 114 acting as a control device and injects fuel.

The fuel inside a combustion chamber 106 is ignited and combusted by spark ignition using an ignition plug 104. Each ignition plug 104 has an ignition module 112 in which a power transistor is provided. The power transistor controls an ignition coil and the supply of power to the ignition coil.

Combustion gas inside combustion chamber 106 flows out into an exhaust pipe 111 via an exhaust valve 107. A front catalytic converter 108 and a rear catalytic converter 109 provided in exhaust pipe 111 purify the exhaust gas flowing through exhaust pipe 111.

An intake camshaft 134 and an exhaust camshaft 110 integrally include a cam, and intake valve 105 and exhaust valve 107 are driven by the cam.

Intake valve 105 has a configuration such that the valve timing is variably controlled by a variable valve timing mechanism (an electric VTC) 113 which rotates intake camshaft 134 relatively to crankshaft 120 using an electric motor (an actuator).

As illustrated in FIGS. 2 to 7, electric VTC 113 includes a timing sprocket 1 which is a driving rotation body which is rotated by crankshaft 120 of the internal combustion engine, intake camshaft 134 which is rotatably supported on a cylinder head via a bearing 44 and rotated by a rotational force transmitted from a timing sprocket 1, a cover member 3 which is arranged in a front portion of timing sprocket 1, and then fixed and attached by bolts to chain cover 40 which is a fixing portion, and a phase change mechanism 4 which is a change mechanism arranged between timing sprocket 1 and intake camshaft 134 to change the relative rotation phase of both members 1 and 2 according to a driving state of an engine.

The entire timing sprocket 1 is integrally formed from an iron-based metal and is configured of an annular sprocket main body 1a, the inner peripheral surface of which has a stepped diameter shape, and a gear portion 1b which is integrally provided at an outer periphery of sprocket main body 1a and receives a rotational force from the crankshaft via a timing chain 42 which is wound.

In addition, timing sprocket 1 is rotatably supported to intake camshaft 134 by a third ball bearing 43 which is a third bearing provided between a circular groove 1c formed in an inner peripheral side of sprocket main body 1a and an outer periphery of a thick flange portion 2a integrally provided at the front end of intake camshaft 134.

A ring-shaped protrusion 1e is integrally formed at the outer peripheral edge of the front end of sprocket main body 1a. A ring-shaped member 19 and a large diameter annular plate 6 are commonly fastened and fixed by a bolt 7 in the axial direction at the front end of sprocket main body 1a. Ring-shaped member 19 is coaxially positioned in an inner peripheral side of ring-shaped protrusion 1e and internal teeth 19a serving as a wave-shaped mating portion is formed at an inner periphery of ring-shaped member 19.

Figure 5:
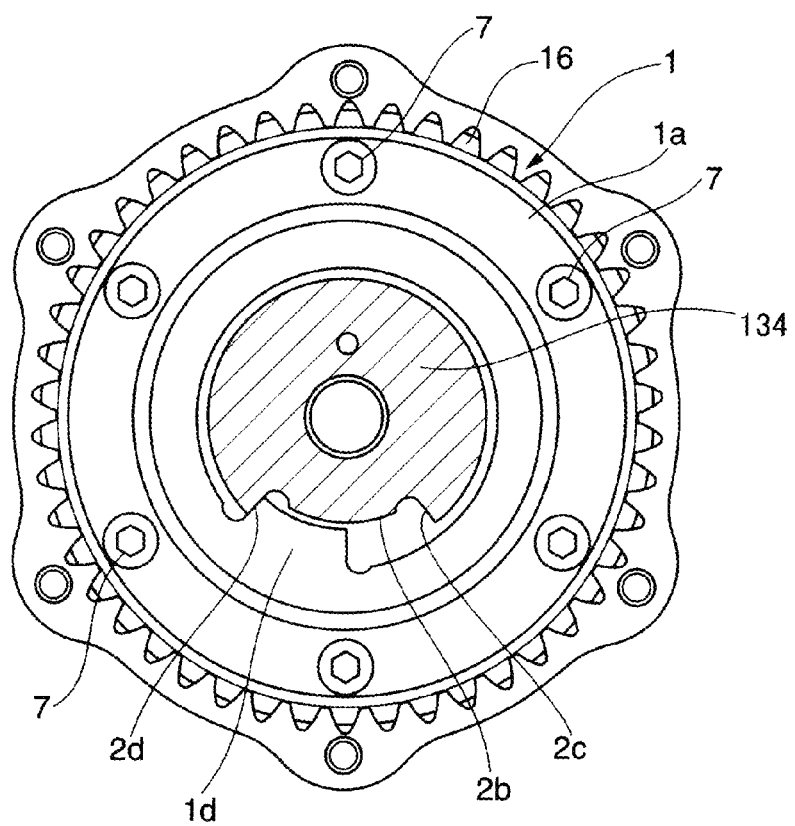
FIG. 5 is a cross-sectional view taken along a line B-B in FIG. 2.

In addition, as illustrated in FIG. 5, a stopper convex portion 1d, which is a circular fastening portion, is formed at a part of the inner peripheral surface of sprocket main body 1a to a range of a predetermined length along a circumferential direction thereof.

A circular housing 5, which is protruded forward, is fixed to the outer periphery of the front end of plate 6 by bolt 11, in a state in which each configuration member (described below) of a reducer 8 or an electric motor 12 of phase change mechanism 4 is covered.

Housing 5 functions as a yoke and is integrally formed from an iron-based metal and integrally has a circular plate-shaped holding portion 5a at the front end side. The entire outer peripheral side including holding portion 5a is arranged with a covered shape having a predetermined gap by cover member 3.

Intake camshaft 134 has two drive cams per cylinder which operates to open intake valve 105 at the outer periphery. A driven member 9, which is a driven rotation body, is coupled by a cam bolt 10 to the front end from the axial direction.

In addition, as illustrated in FIG. 5, a stopper concave groove 2b, which is a locking portion into which stopper convex portion 1d of sprocket main body 1a is inserted, is formed at flange portion 2a of intake camshaft 134 along the circumferential direction. Stopper concave groove 2b is formed in a circular shape having a predetermined length in the circumferential direction, and edges of both ends of stopper convex portion 1d, which rotates over the range of the length, come in contact with opposite edges 2c and 2d in the circumferential direction respectively. Thus, the relative rotational position of the maximum advanced angle side or the maximum retard angle side of intake camshaft 134 to timing sprocket 1 is regulated.

Cam bolt 10 is integrally formed with a flange-shaped bearing surface 10c at an end edge of a head portion 10a at the side of a shaft portion 10b. A male screw portion, which screws a female screw portion formed in the internal axial direction from the end portion of intake camshaft 134, is formed at the outer periphery of the shaft portion 10b.

Figure 3:
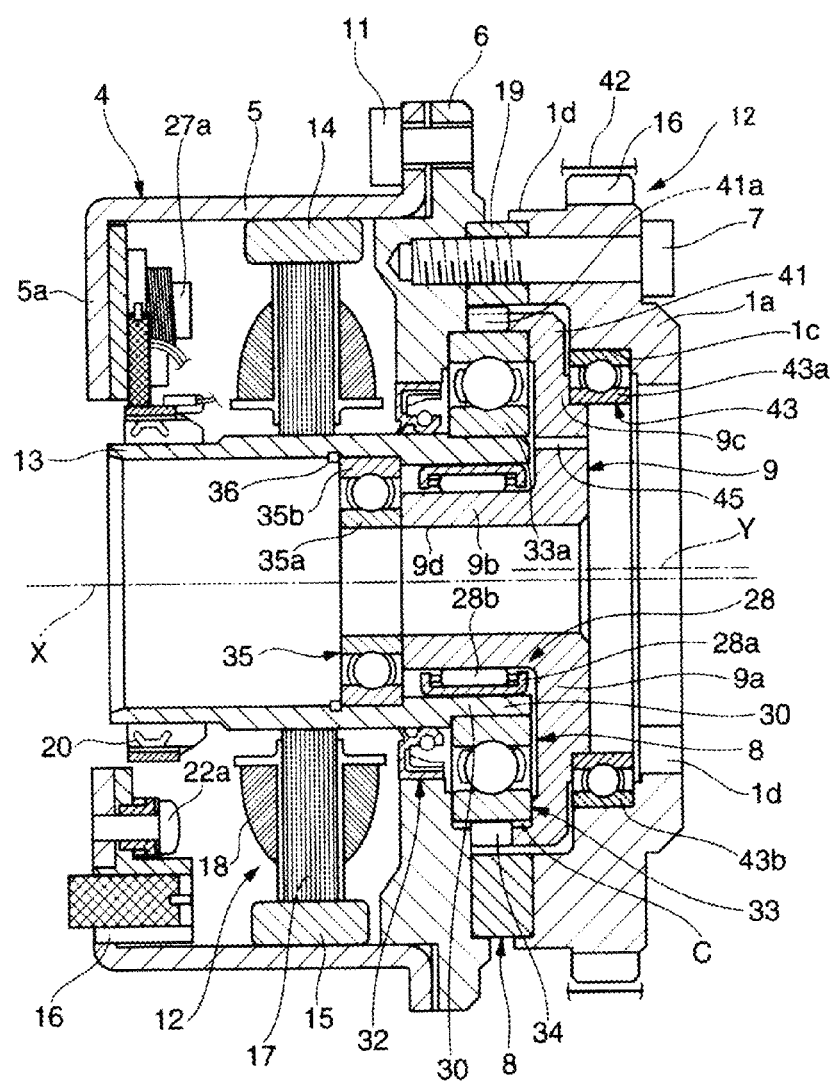
FIG. 3 is an enlarged cross-sectional view illustrating a main portion of main components in the variable valve timing mechanism.
Figure 4:
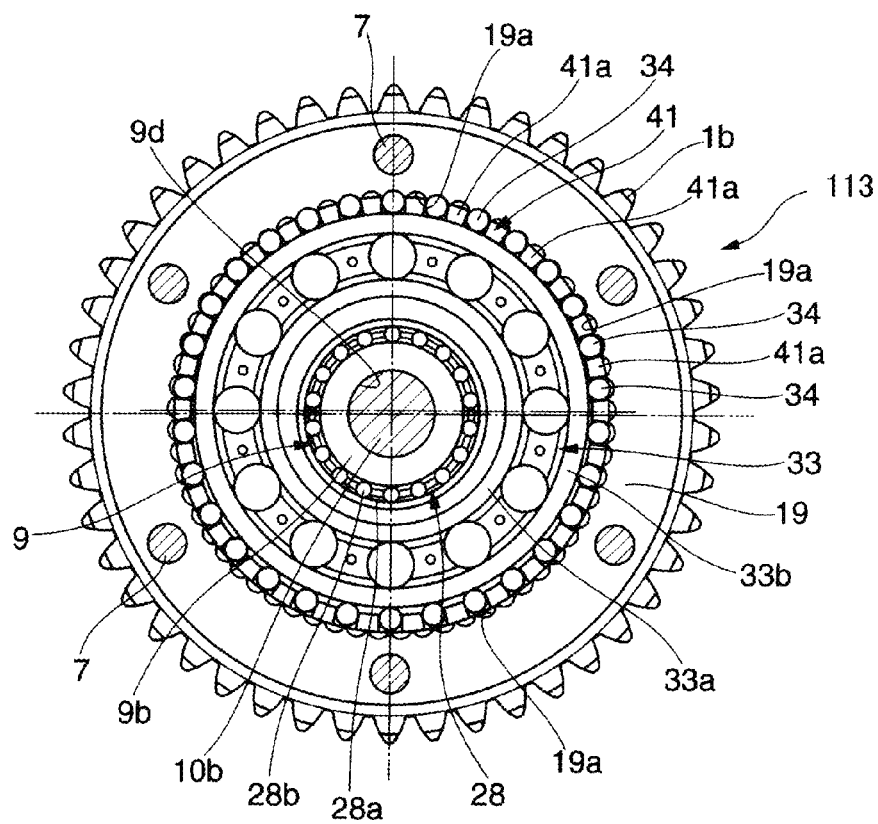
FIG. 4 is a cross-sectional view taken along a line A-A in FIG. 2.

Driven member 9 is integrally formed with the iron-based metal and as illustrated in FIG. 3, is configured of a disk portion 9a formed at the front end side and a cylindrical barrel portion 9b integrally formed at the rear end side.

Disk portion 9a is integrally configured such that a ring-shaped step protrusion 9c having substantially the same outer diameter as flange portion 2a of intake camshaft 134 at a substantially center position in the radial direction of the rear end surface and the outer periphery surface of step protrusion 9c and the outer periphery surface of flange portion 2a are inserted and arranged at the inner periphery of an inner ring 43a of third ball bearing 43. An outer ring 43b of third ball bearing 43 is pressed and fixed to the inner peripheral surface of circular groove 1c of sprocket main body 1a.

In addition, as illustrated in FIGS. 2 to 6, a holder 41, which holds a plurality of rollers 34 (described below), is integrally provided at the outer periphery portion of disk portion 9a. Holder 41 is formed to protrude from the outer periphery portion of disk portion 9a in the same direction as barrel portion 9b and is formed by a plurality of long narrow protrusions 41a having a predetermined gap at the positions at substantially regular intervals in the circumferential direction.

Figure 2:
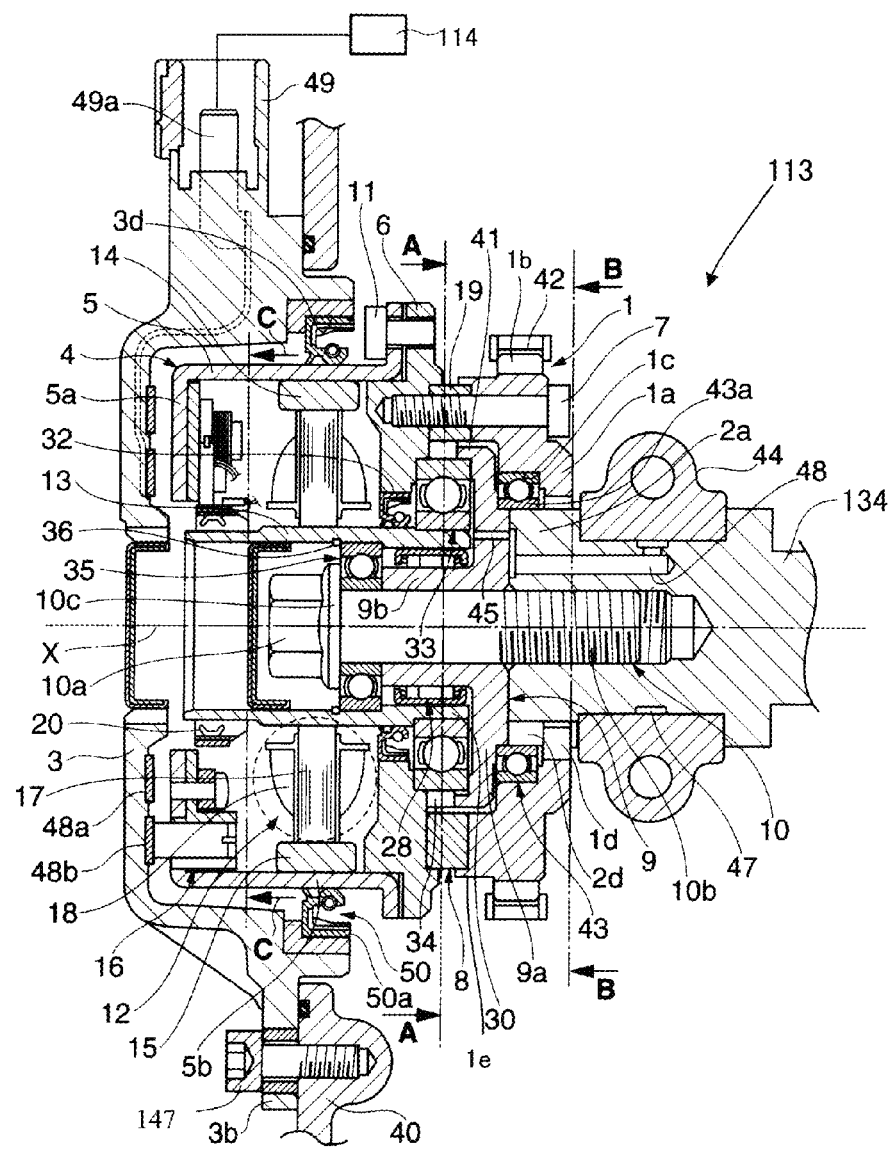
FIG. 2 is a vertical cross-sectional view illustrating a variable valve timing mechanism in the embodiment.

As illustrated in FIG. 2, barrel portion 9b is configured such that an insertion hole 9d, into which shaft portion 10b of cam bolt 10 is inserted, is formed by penetration at the center position and a first needle bearing 28 (described below), which is a first bearing, is provided at the outer peripheral side.

Figure 6:
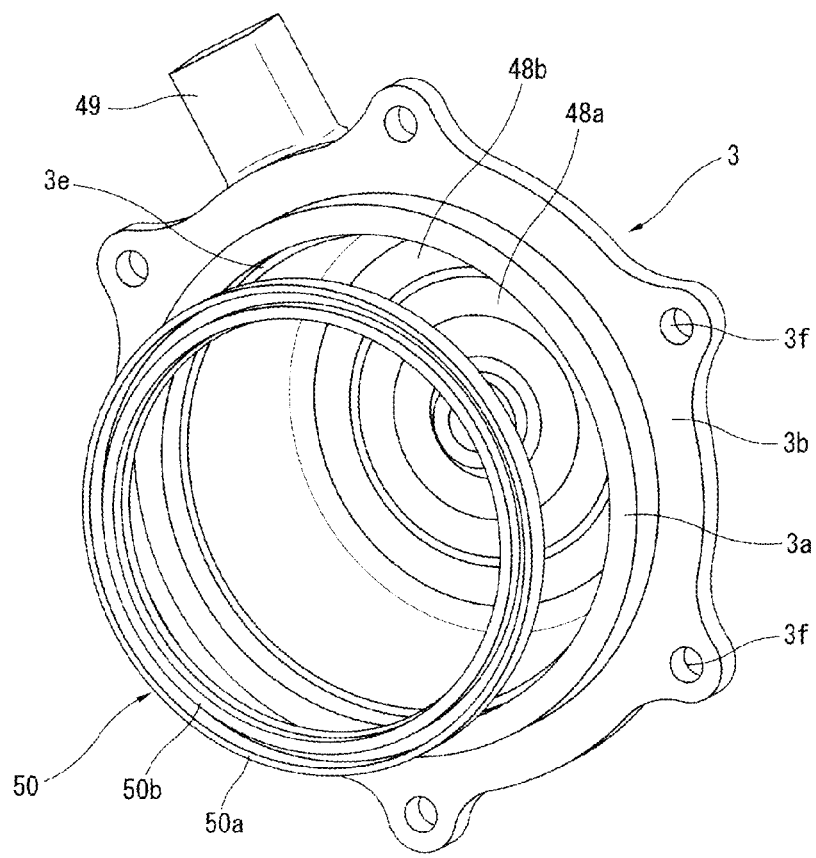
FIG. 6 is an exploded perspective view illustrating a cover member and a first oil seal provided in the variable valve timing mechanism.

As illustrated in FIGS. 2 and 6, cover member 3 is integrally formed from a relatively thick synthetic resin material, and is configured of a cover main body 3a bulged out in a cup shape and a bracket 3b integrally having cover main body 3a at the outer periphery of the rear end portion.

Cover main body 3a is arranged to cover the front end side of phase change mechanism 4, in other words, to cover substantially the entire rear end portion from a holder 5b of housing 5 in the axial direction with a predetermined gap. Meanwhile, bolt insertion holes 3f are each formed by penetration in six boss portions formed in substantially ring shape at bracket 3b.

In addition, as illustrated in FIG. 2, cover member 3 is configured such that bracket 3b is fixed to chain cover 40 via a plurality of bolts 147, and inside and outside slip rings 48a, 48b are embedded and fixed at the inner peripheral surface of front end portion 3c of cover main body 3a in a state in which each inner end surface is exposed. At an upper end portion of cover member 3, a connector portion 49 is provided. At the inside thereof, a connector terminal 49a which is connected to slip rings 48a and 48b via a conductive member is fixed. In addition, connector terminal 49a is connected or disconnected from a battery power supply (not shown) via a control unit 21.

Thus, as illustrated in FIG. 2, a first oil seal 50 having a large diameter, which is a seal member, is interposed between the inner peripheral surface at the rear end portion side of cover main body 3a and the outer periphery surface of housing 5. First oil seal 50 is formed in a substantially U shape in cross-section thereof and a core bar is embedded inside a substrate of a synthetic rubber. A ring-shaped base portion 50a at the outer peripheral side is fitted and fixed inside circular groove 3d formed in the inner peripheral surface of the rear end portion of cover member 3a. In addition, a seal surface 50b, which abuts against the outer periphery surface of housing 5, is integrally formed at the inner peripheral side of ring-shaped base portion 50a.

Phase change mechanism 4 is configured of electric motor 12 which is arranged at the front end side substantially coaxial with intake camshaft 134 and reducer 8 which reduces the rotation speed of electric motor 12 and transmits the rotation of the speed to intake camshaft 134.

As illustrated in FIGS. 2 and 3, electric motor 12 is a brushed DC motor and includes housing 5 which is a yoke integrally rotating with timing sprocket 1, a motor shaft 13 which is an output shaft rotatably provided inside housing 5, a pair of semicircular permanent magnets 14 and 15 which are fixed at the inner peripheral surface of housing 5, and a stator 16 which is fixed to an inner bottom surface of holding portion 5a of the housing.

Motor shaft 13 is formed in a cylindrical shape and functions as an armature. An iron core rotor 17 having a plurality of poles is fixed at the outer periphery of the substantially center position of motor shaft 13 in the axial direction and an electromagnetic coil 18 is wound around the outer periphery of iron core rotor 17. In addition, a commutator 20 is pressed and fixed at the outer periphery of the front end portion of motor shaft 13. Electromagnetic coil 18 is connected to each segment divided into the same number as the number of the poles of iron core rotor 17a at commutator 20.

Figure 7:
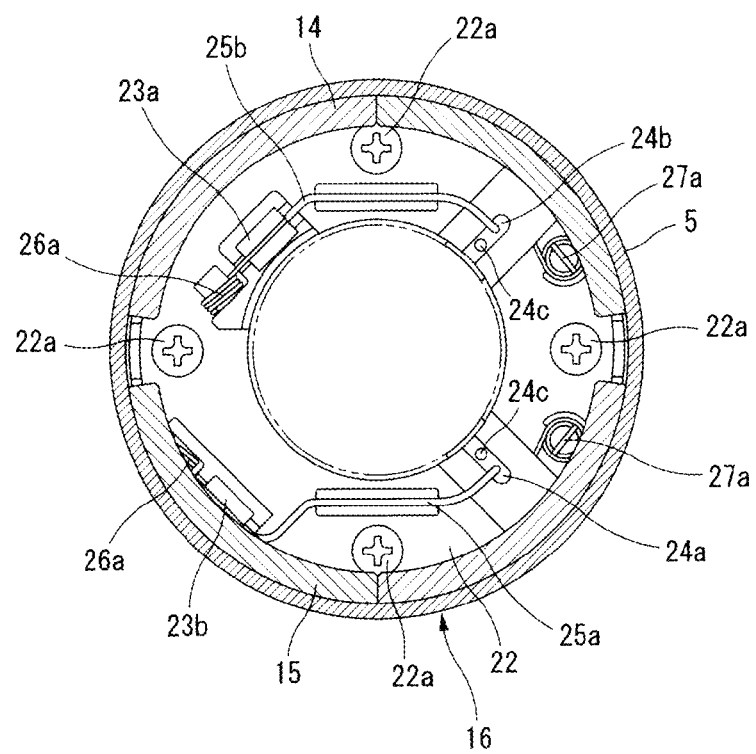
FIG. 7 is a cross-sectional view taken along a line C-C in FIG. 2.

As illustrated in FIG. 7, stator 16 is mainly configured of a disk-shaped resin holder 22 which is fixed by four screws 22a at an inner bottom wall of holding portion 5a, two inside and outside first brushes 23a and 23b in the circumferential direction which are arranged to penetrate resin holder 22 and holding portion 5a in the axial direction, and second brushes 24a and 24b which are retractably held inward at the inner peripheral side of resin holder 22. Each front end surface of first brushes 23a and 23b comes into sliding contact with a pair of slip rings 48a and 48b so as to be fed with the power supply. Circular front end portions of second brushes 24a and 24b come into sliding contact with the outer periphery surface of the commutator 20.

First brushes 23a and 23b and second brushes 24a and 24b are connected by pig tail harnesses 25a and 25b, and biased in the direction of slip rings 48a and 48b or in the direction of commutator 20 by a spring force of twist springs 26a and 27a elastically connected respectively.

Motor shaft 13 is rotatably supported to the outer periphery surface of shaft portion 10b of head portion 10a side of cam bolt 10 via a needle bearing 28 which is the first bearing and a fourth ball bearing 35 which is a bearing arranged at the side portion in the axial direction of needle bearing 28. In addition, a cylindrical eccentric shaft portion 30, which constitutes a part of reducer 8, is integrally provided at the rear end portion of intake camshaft 134 side of motor shaft 13.

First needle bearing 28 is configured of a cylindrical retainer 28a which is pressed in the inner peripheral surface of eccentric shaft portion 30, and needle rollers 28b which are a plurality of rolling bodies rotatably held inside retainer 28a. Needle rollers 28b roll the outer periphery surface of barrel portion 9b of driven member 9.

Fourth ball bearing 35 is configured such that inner ring 35a is fixed in a pinched state between the front end edge of barrel portion 9b of driven member 9 and seat surface portion 10c of cam bolt 10, meanwhile, outer ring 35b is supported to be positioned in the axial direction between a step portion which is formed at the inner periphery of motor shaft 13 and a snap ring 36 which is an anti-slip ring.

In addition, a second oil seal 32, which is a friction member preventing lubricant from leaking from the inside of reducer 8 into electric motor 12, is provided between the outer periphery surface of motor shaft 13 (eccentric shaft portion 30) and the inner peripheral surface of plate 6. The inner peripheral surface of second oil seal 32 elastically contacts the outer periphery surface of motor shaft 13 so that second oil seal 32 provides frictional resistance against the rotation of motor shaft 13.

As illustrated in FIGS. 2 and 3, reducer 8 is mainly configured of eccentric shaft portion 30 which performs an eccentric rotation movement, a second ball bearing 33 which is a second bearing provided at the outer periphery of eccentric shaft portion 30, roller 34 which is provided at the outer periphery of second ball bearing 33, holder 41 which allows moving of roller 34 in the radial direction while holding roller 34 in the rolling direction, and driven member 9 which is integrally formed with holder 41.

Eccentric shaft portion 30 is configured such that a shaft center Y of the cam surface formed at the outer periphery surface is slightly deviated from a shaft center X of motor shaft 13 in the radial direction. In addition, second ball bearing 33, roller 34 and the like are configured as a planetary mating portion.

Second ball bearing 33 is formed in a large diameter shape and the entire second ball bearing 33 is arranged at a position in the radial direction of first needle bearing 28 in an overlapped state. Inner ring 33a is pressed and fixed at the outer periphery surface of eccentric shaft portion 30 and roller 34 constantly abuts the outer periphery surface of outer ring 33b. In addition, circular gap C is formed at the outer peripheral side of outer ring 33b and thereby the entire second ball bearing 33 is able to move in the radial direction, in other words, is able to eccentrically move according to the eccentric rotation of eccentric shaft portion 30 by gap C.

Each roller 34 engages with internal teeth 19a of ring-shaped member 19 while moving in the radial direction according to the eccentric movement of second ball bearing 33 and is configured to swing in the radial direction while being guided in the circumferential direction by protrusion 41a of holder 41.

Lubricant is supplied by lubricant supply means inside reducer 8. As illustrated in FIG. 2, lubricant supply means is configured of a lubricant supply passage 47 which is formed inside bearing 44 of cylinder head and through which the lubricant is supplied from a main lubricant gallery (not shown), a lubricant supply hole 48 which is formed inside intake camshaft 134 in the axial direction and communicates with lubricant supply passage 47 via a groove, an oil supply hole 45, which is formed to penetrate driven member 9 inside thereof in an axial direction, and has a small diameter, of which an end is opened to lubricant supply hole 48 and the other end is opened to near second ball bearing 33 and first needle bearing 28, and three large-diameter oil discharge holes (not shown), which are formed to penetrate the driven member 9 in the same manner.

Hereinafter, operation of electric VTC 113 is described. When the crankshaft of the engine rotates, timing sprocket 1 rotates via timing chain 42. Electric motor 12 is synchronously rotated by the rotational force via housing 5, ring-shaped member 19 and plate 6. Meanwhile, the rotational force of ring-shaped member 19 is transmitted from roller 34 to intake camshaft 134 via holder 41 and driven member 9. Accordingly, the cam of intake camshaft 134 opens and closes the intake valve.

Thus, when electric VTC 113 is driven and then the rotation phase (valve timing of intake valve 105) of intake camshaft 134 is changed, electromagnetic coil 18 of electric motor 12 is conducted from control unit 21 via slip rings 48a and 48b or the like. Thereby, motor shaft 13 is driven to rotate and the rotational force which is reduced is transmitted to intake camshaft 134 via reducer 8.

In other words, when eccentric shaft portion 30 is eccentrically rotated due to the rotation of motor shaft 13, each roller 34 is guided by protrusion 41a of holder 41 in the radial direction for each rotation of motor shaft 13. Each roller 34 moves through one internal tooth 19a of ring-shaped member 19, thereby moves while rolling to another adjacent internal tooth 19a and rolling in the circumferential direction while this is sequentially repeated. The rotational force is transmitted to driven member 9 while reducing the rotation speed of motor shaft 13 through the rolling contact of each roller 34. At this time, a reduction ratio is able to be freely set by the number of rollers 34 or the like.

Accordingly, intake camshaft 134 relatively normally and reversely rotates with respect to timing sprocket 1 and thereby the relative rotational position is changed. Thus, the opening and closing timing of the intake valve is controlled to change to the advanced angle side or the retard angle side.

Thus, the maximum position regulation (angle position regulation) of the normal and reverse relative rotation of intake camshaft 134 with respect to timing sprocket 1 is performed through the abutting of each side surface of stopper convex portion 1d to any one of each opposite surface 2c and 2d of stopper convex groove 2b.

In other words, driven member 9 rotates in the same direction as the rotation direction of timing sprocket 1 according to the eccentric rotation of eccentric shaft portion 30. Thereby, one side surface of stopper convex portion 1d abuts on opposite surface 1c of one side of stopper concave groove 2b so that further rotation in the same direction is regulated. Thus, intake camshaft 134 is configured such that the relative rotational phase with respect to timing sprocket 1 is maximally changed to the advanced angle side.

Meanwhile, driven member 9 rotates in the direction reverse to the rotation direction of timing sprocket 1 and thereby the other side surface of stopper convex portion 1d abuts opposite surface 2d of the other side of stopper concave groove 2b and the further rotation in the same direction is regulated. Thus, intake camshaft 134 is configured such that the relative rotational position with respect to timing sprocket 1 is maximally changed to the retard angle side.

Return to FIG. 1, ECU 114 has a microcomputer therein and performs computation according to a program stored in advance in memory. ECU 114 controls electronic control throttle 103, fuel injection valve 131, ignition module 112 or the like.

ECU 114 inputs detection signals from various sensors. As the various sensors, an accelerator opening sensor 116 which detects an opening (an accelerator opening) ACC of an accelerator pedal 116a, an air flow sensor 115 which detects an intake air amount Q of internal combustion engine 101, a crank angle sensor (a rotation sensor) 117 which outputs a rotation signal (a unit crank angle signal) POS having a pulse shape according to the rotation of crankshaft 120 that is the output shaft of internal combustion engine 101, a throttle sensor 118 which detects an opening TVO of throttle valve 103b, a water temperature sensor 119 which detects a temperature TW of a coolant for internal combustion engine 101, a cam sensor 133 which outputs a cam signal PHASE having a pulse shape according to the rotation of intake camshaft 134, a motor rotation sensor 201 which detects the motor shaft rotation angle of the electric motor driving electric VTC 113, a brake switch 122 which becomes ON in a braking state in which the driver of the vehicle steps on brake pedal 121, a vehicle speed sensor 123 which detects the running speed (a vehicle speed) VSP of the vehicle in which internal combustion engine 101 is the power source, and the like are provided.

Furthermore, ECU 114 inputs ON and OFF signals of ignition switch 124, which is the main switch for driving and stopping of internal combustion engine 101, or ON and OFF signals of a stator switch 125.

Figure 8:
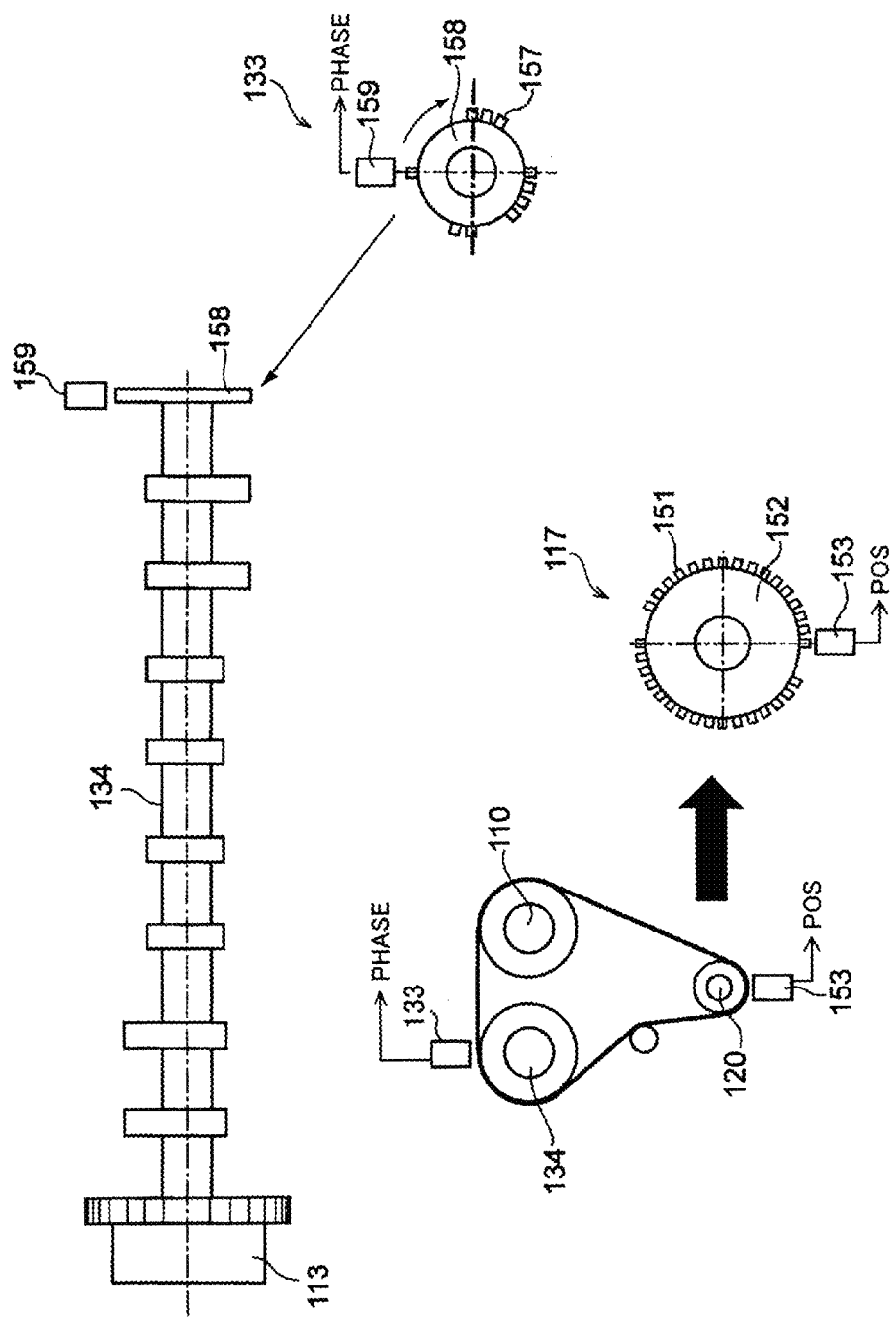
FIG. 8 is a view illustrating a structure of a crank angle sensor and a cam sensor in the embodiment.

FIG. 8 illustrates a structure of crank angle sensor 117 and cam sensor 133.

Crank angle sensor 117 includes a signal plate 152 and a rotation detecting device 153. Signal plate 152 is supported at crankshaft 120 and has, at its circumference, projection 151 which serves as an object to be detected. Rotation detecting device 153 is secured at the side of internal combustion engine 101, detects projection 151, and thereby outputs rotation signal POS.

Rotation detecting device 153 includes various processing circuits such as a wave form generating circuit and a selection circuit, and a pickup which detects projection 151. Rotation signal POS which is output by rotation detecting device 153 is a pulse signal formed of a pulse train which is normally a low level, and changes to a high level for a fixed time when projection 151 is detected.

Projection 151 of signal plate 152 is formed at regular intervals with a 10 degree pitch in the crank angle. There are two absent portions of projections 151. In each of the absent portions, two projections 151 are consecutively absent. The two absent portions are located at opposite sides of the central axis of crankshaft 120.

In addition, the number of the absent projections 151 may be one, or may be three or more, consecutively.

According to the arrangement described above, as illustrated in FIG. 9, the rotation signal POS which is output from crank angle sensor 117 (rotation detecting device 153) holds the low level for 30 degrees after changing to the high level 16 times continuously every 10 degrees (a unit crank angle) in the crank angle. The rotation signal POS again changes to the high level 16 times continuously.

Accordingly, initial rotation signal POS after the low level period of 30 degrees crank angle (an absent projection region and an absent portion) will be output at a 180 degree crank angle interval. In four-cylinder engine 101 of the embodiment, the 180 deg crank angle corresponds to a stroke phase difference between cylinders, in other words, to an ignition interval.

In addition, in the embodiment, crank angle sensor 117 is set such that initial rotation signal POS after the low level period (the absent projection region) in which the crank angle is 30 degrees is output at a piston position of 50 degrees (BTDC 50 degrees) before the dead center of the top of each cylinder.

Meanwhile, cam sensor 133 includes a signal plate 158 and a rotation detecting device 159. Signal plate 158 is rotatably supported to an end portion of intake camshaft 134 and has, on its circumference, a projection 157 which serves as a detected portion. Rotation detecting device 159 is secured at the side of internal combustion engine 101, and detects projection 157 and thereby outputs cam signal PHASE.

Rotation detecting device 159 includes various processing circuits such as a wave form shaping circuit, and a pickup which detects projection 157.

Projections 157 of signal plate 158 are provided such that one, three, four, and two respectively are located at four positions equally spaced apart every 90 degrees of the cam angle. A pitch of projection 157 is set to 30 degrees of the crank angle (15 degrees of the cam angle) at a portion in which a plurality of projections 157 is continuously provided.

Figure 9:
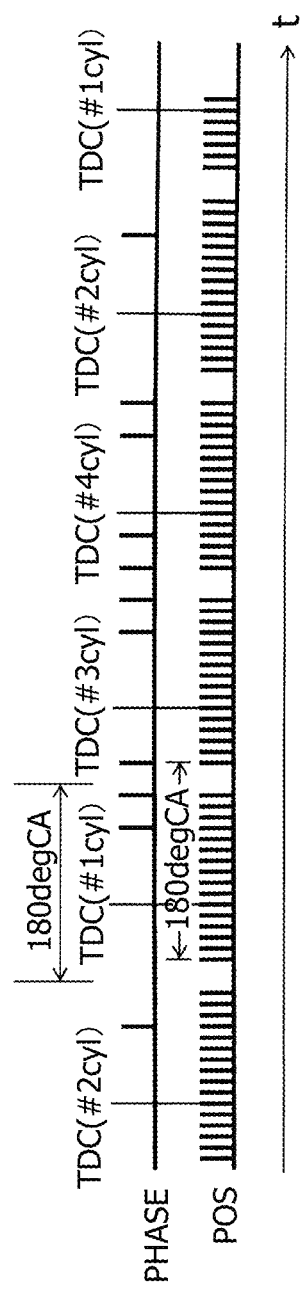
FIG. 9 is a time chart illustrating output characteristics of a crank angle sensor and a cam sensor in the embodiment.

Thus, as illustrated in FIG. 9, cam signal PHASE which is output from cam sensor 133 (rotation detecting device 159) is a pulse signal composed of a pulse train which is at the low level and changes to the high level only for a predetermined time when projection 157 is detected. In addition, cam signal PHASE changes to the high level for one projection alone, three consecutive projections, four consecutive projections and two consecutive projections for every 90 degrees of the cam angle and 180 degrees of the crank angle.

In addition, cam signal PHASE of one projection alone and the first signal of a plurality of cam signals PHASE output in succession are output at 180 degree intervals of the crank angle. The output patterns of one projection alone, the three consecutive projections, the four consecutive projections and the two consecutive projections are output respectively between the top dead center TDC of a certain cylinder and the top dead center TDC of the next cylinder. In addition, an output position and an output interval of cam signal PHASE are set in anticipation of the change range of the valve timing so that the output position of cam signal PHASE does not change across top dead center TDC even though valve timing of intake valve 105 is changed by the electric VTC.

More specifically, three consecutive cam signals PHASE are output between compression top dead center TDC of the first cylinder and compression top dead center TDC of the third cylinder. Four consecutive cam signals PHASE are output between compression top dead center TDC of the third cylinder and compression top dead center TDC of the fourth cylinder. Two consecutive cam signals PHASE are output between compression top dead center TDC of the fourth cylinder and compression top dead center TDC of the second cylinder. One cam signal PHASE is output between compression top dead center TDC of the second cylinder and compression top dead center TDC of the first cylinder.

The number of consecutive outputs of cam signal PHASE which is output between each top dead center TDC denotes the cylinder number which is to be the next compression top dead center. For example, in a case in which three consecutive cam signals PHASE are output between top dead center TDC of the current time and top dead center TDC of the previous time, top dead center TDC of this time denotes compression top dead center TDC of the third cylinder.

The ignition is performed in the order of the first cylinder, the third cylinder, the fourth cylinder and the second cylinder in four-cylinder engine 101 of the embodiment. Accordingly, as illustrated in FIG. 9, the output pattern of cam signal PHASE which is output between top dead centers TDC is set in the order of one signal alone, three consecutive signals, four consecutive signals, and two consecutive signals.

ECU 114 determines, for example, the projection absent positions of the rotation signal POS based on the change of the period of rotation signal POS. The number of generations of rotation signals POS is counted with reference to the projection absent positions and thereby top dead center TDC (reference crank angle position REF) is detected. In the embodiment, a sixth rotation signal POS output after the projection absent region of rotation signal POS, corresponds to top dead center TDC of each cylinder.

Thus, ECU 114 counts the number of outputs of cam signal PHASE output between top dead centers TDC so as to determine the next cylinder of which the piston position reaches compression top dead center TDC (a predetermined piston position), and also counts the number of generations of rotation signal POS from top dead center TDC, and to detect the crank angle at that time based on a counted value CNTPOS.

When the cylinder and the crank angle of compression top dead center TDC are detected, ECU 114 determines the cylinder to which the fuel is to be injected and which is to be ignited, fuel injection timing and the ignition timing. ECU 114 outputs the injection pulse signal or the ignition control signal according to the angle (the crank angle) of crankshaft 120 which is detected based on the counted value CNTPOS.

The determination result of the cylinder, of which the piston position reaches compression top dead center TDC (a predetermined piston position), is updated along the order of the ignition. Therefore, after determining the next cylinder of which position reaches compression top dead center TDC (a predetermined piston position) by counting the number of outputs of cam signal PHASE between top dead centers TDC, the cylinder of compression top dead center TDC can be updated along the order of the ignition every top dead center TDC.

In addition, an interval, during which the number of generations of cam signal PHASE is counted, is not limited to the period between top dead centers TDC. Instead, any crank angle (the piston position) may be the reference for the interval during which the number of generations of cam signal PHASE is counted.

Furthermore, the cylinder of which position is at the predetermined piston position can be determined based on the difference in the pulse width of cam signal PHASE or the like, instead of determining the cylinder of which a position is at the predetermined piston position based on the number of generations of cam signal PHASE.

In addition, in the embodiment, a part of the pulse train of rotation signal POS is absent so as to make it possible to detect the angle position (the crank angle) of crankshaft 120 by using the absent position as the reference. However, rotation signal POS may be output every 10 degrees without absent portion, and then a reference position sensor which generates the signal at the reference crank angle position every 180 degrees of the crank angle is provided instead and rotation signal POS is counted based on the output signal of the reference position sensor, so that the angle position (crank angle) of crankshaft 120 can be detected.

In addition, by counting the number of generations of rotation signal POS from the reference crank angle position to one cam signal PHASE or to the first signal of a plurality of cam signals PHASE output in succession, the rotation phase (a real valve timing of intake valve 105) of intake camshaft 134 with respect to crankshaft 120, which is changed by electric VTC 113, can be detected, and the feedback control can be performed based on the detected value so that the valve timing is brought close to the target value.

In addition, in a case in which internal combustion engine 101 (crankshaft 120) rotates (forward rotation) in the forward direction, the generation of rotation signal POS indicates that crankshaft 120 rotates forward only 10 degrees and the number of generations of rotation signal POS from the reference crank angle position indicates the rotation angle of crankshaft 120 from the reference crank angle position.

However, internal combustion engine 101 (crankshaft 120) may rotate in the reverse direction (reverse rotation) by the compression pressure inside the cylinder just before the stopping of internal combustion engine 101. When the number of generations of rotation signals POS is continuously counted even in the reverse rotation similarly to forward rotation, the incorrect angle position (the crank angle) of crankshaft 120 may be detected.

Figure 10:
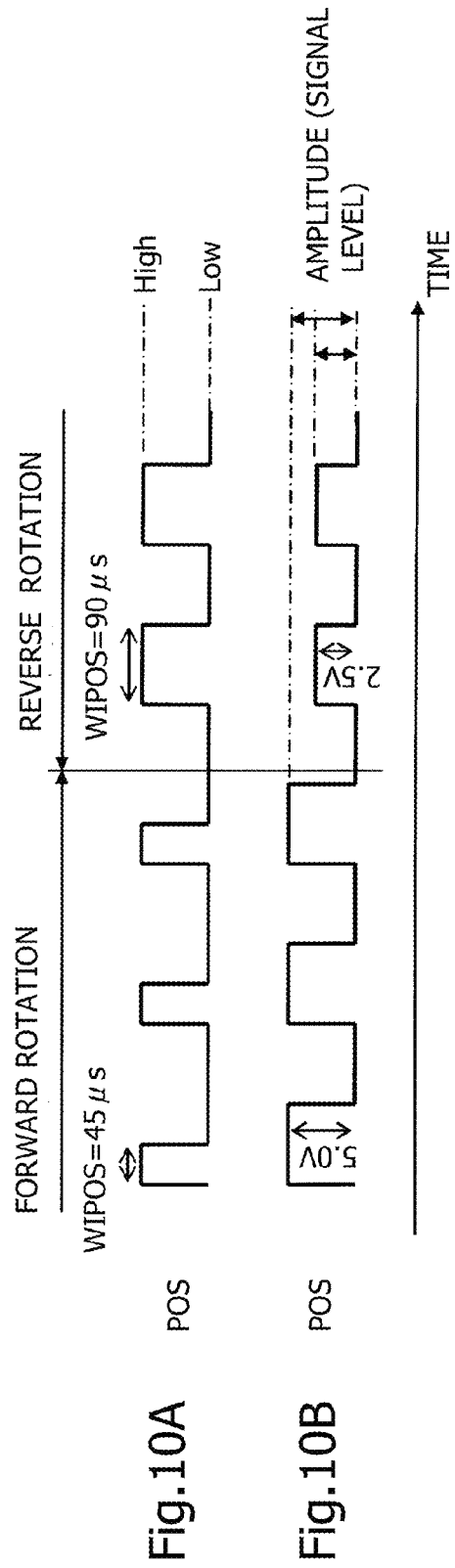
FIG. 10 is a time chart illustrating difference in a pulse width and amplitude according to forward rotation and reverse rotation of a rotation signal in the embodiment.

Therefore, crank angle sensor 117 (rotation detecting device 153) outputs rotation signal POS (pulse signal) which has a different pulse width during forward rotation and reverse rotation of crankshaft 120 so that forward rotation and reverse rotation of internal combustion engine 101 (crankshaft 120) can be determined (see FIG. 10A).

As method of generating the pulse signal having the pulse width varying with the rotation direction of the rotation shaft, the method disclosed in, for example, Japanese Laid-Open Publication No. 2001-165951 is used. Specifically, as the detection pulse signal of projection 151 of signal plate 152, two signals, which have mutually different phases, are generated and the forward rotation and the reverse rotation are determined by comparing these signals. Any one of two pulse signals to be generated to have pulse widths WIPOS different from each other is selected based on the determination result of the rotating direction of the engine, and then, the selected pulse signal is output.

ECU 114 measures pulse width WIPOS of rotation signal POS and compares the measured value WIPOS of the pulse width with a threshold value SL which is a threshold value for determining whether crankshaft 120 is rotated in the forward direction or the reverse direction, to thereby determine whether the pulse width is pulse width WIPOS in the forward rotation or pulse width WIPOS in the reverse rotation. Thus, it is determined whether crankshaft 120 is rotated in the forward direction or the reverse direction.

Threshold value SL used to determine a rotating direction of the engine is set to an intermediate value (for example, 55 μs to 80 μs) between pulse width WIPOS in the forward rotation and pulse width WIPOS in the reverse rotation. In the embodiment in which pulse width WIPOS in the reverse rotation is greater than pulse width WIPOS in the forward rotation, when pulse width WIPOS is equal to or greater than threshold value SL, the reverse rotation state is determined and when pulse width WIPOS is below threshold value SL, the forward rotation state is determined.

In addition, as illustrated in FIG. 10A, in the embodiment, pulse width WIPOS in the forward rotation is set to 45 μs is and pulse width WIPOS in the reverse rotation is set to 90 μs; however, pulse width WIPOS is not limited to 45 μs and 90 μs described above. In addition, pulse width WIPOS in the forward rotation may be set to be greater than pulse width WIPOS in the reverse rotation.

In the example illustrated in FIG. 10A, rotation signal POS is a pulse signal which is normally at a low level and changes to a high level only for a fixed time at a predetermined angle position. Rotation signal POS, however, may be a pulse signal which is normally at a high level and changes to a low level only for a fixed time at a predetermined angle position. In this case, the period of the low level may be set to have a different rotation direction, so that the length of the period of the low level is measured as pulse width WIPOS to determine the rotation direction.

In addition, as illustrated in FIG. 10B, amplitude (signal level) of rotation signal POS may be varied according to the forward rotation and the reverse rotation, so that the direction of rotation can be determined based on the difference in the amplitude (the signal level).

In the example illustrated in FIG. 10B, rotation signal POS is a pulse signal which is normally at a low level and changes to a high level only for a fixed time at a predetermined angle. The signal level at the predetermined angle position is set to be higher in the forward rotation than in the reverse rotation when the predetermined angular position is reached. Specifically, the signal level is set to output a 5-V signal in the forward rotation and to output a 2.5-V signal in the reverse rotation.

Thus, as illustrated in FIG. 11A, when crankshaft 120 is in the forward rotation, a count value CNTPOS is increased every generation of rotation signal POS, so that the rotation angle to the forward rotation of crankshaft 120 is detected, and when crankshaft 120 is in the reverse rotation, counted value CNTPOS is decreased in response to the generation of rotation signal POS, so that the rotation angle in the forward rotation is decreased by as much as crankshaft 120 is reversed.

Figure 11:
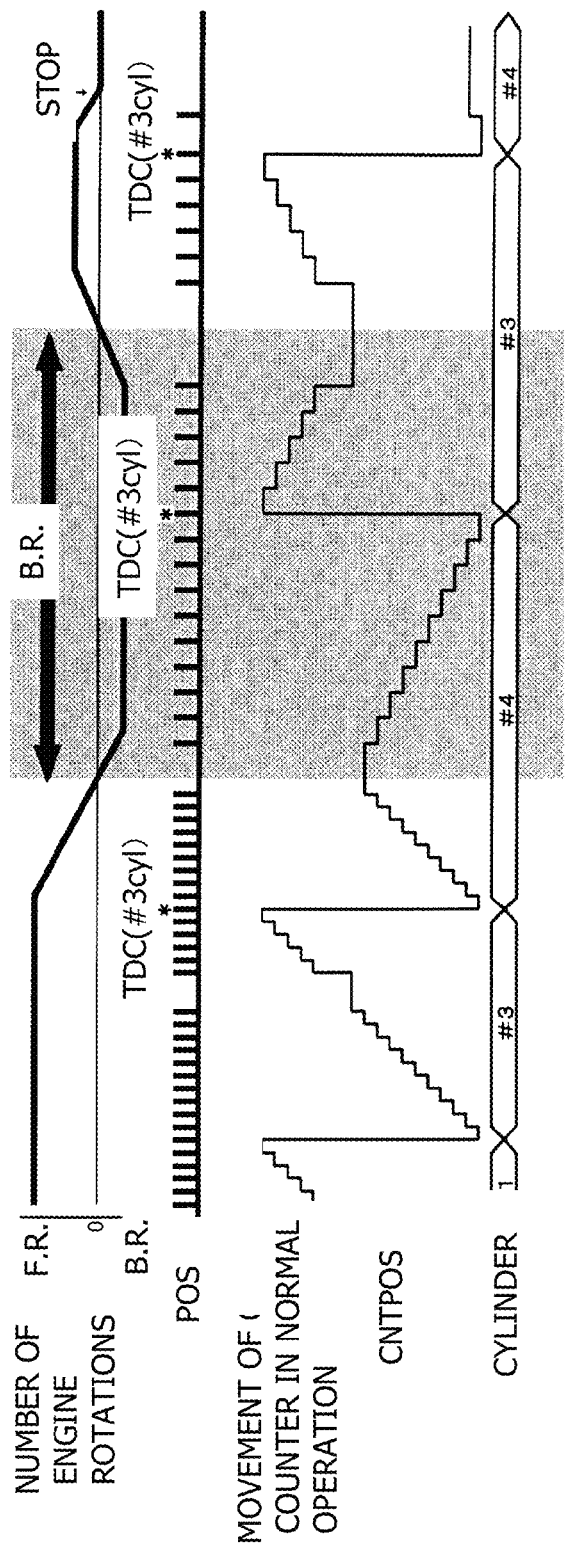
FIG. 11 is a time chart illustrating an increase and decrease change of a counter CNTPOS when reverse rotation is detected in the embodiment.

In addition, in a case in which top dead center TDC is crossed during the reverse rotation, as illustrated in FIG. 11, the determination result of the cylinder in a predetermined piston position is returned to the previous cylinder in the ignition order, thereby detecting the piston position of each cylinder when the internal combustion engine 101 stops.

In the pattern illustrated in FIG. 11, data of the cylinder at the predetermined piston position is updated in the order of the first cylinder, the third cylinder, the fourth cylinder, the third cylinder, and the fourth cylinder. This indicates a state in which internal combustion engine 101 rotates in the reverse direction after passing top dead center TDC of the third cylinder, and then, returns across top dead center TDC of the third cylinder again. Then, internal combustion engine 101 switches from the reverse rotation to the forward rotation between top dead center TDC of the first cylinder and top dead center of the third cylinder, and stops across top dead center TDC of the third cylinder.

As described above, when whether a rotating direction of the engine is determined and then the crank angle is detected, even though internal combustion engine 101 reversely rotates just before internal combustion engine 101 stops, the crank angle at the time of the stopping of the engine and the piston position of each cylinder at the time of the stopping of the engine can be accurately detected.

Figure 12A:
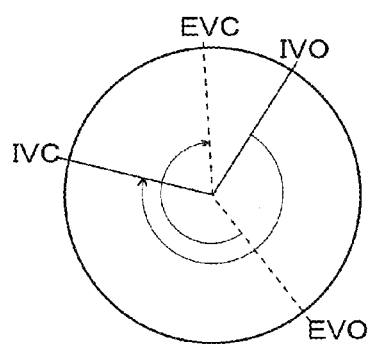
FIGS. 12A and 12B are views illustrating valve timing which is controlled in the embodiment.

Meanwhile, in the internal combustion engine according to the embodiment, as illustrated in FIG. 12A, during normal driving after the starting of the engine, a closing timing of intake valve 105 (IVC) is set to a valve timing which is largely retarded with respect to an intake bottom dead center (BDC), so that a mirror (Atkinson) cycle drive is performed and expansion ratio is increased more than an effective compression ratio of the cylinder. Accordingly, knocking avoiding performance is improved and the mileage can be improved.

Figure 12B:
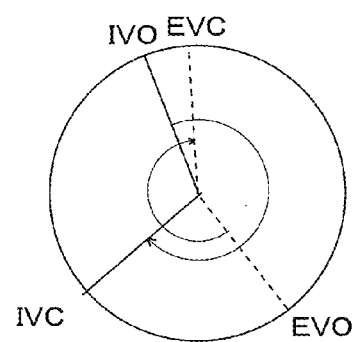

However, during starting, when IVC is excessively retarded (advanced), the intake air amount in the cylinder decreases and then preferable startability is not securable. As illustrated in FIG. 12B, during starting, the valve timing control, in which a retard amount (an advanced amount) of the IVC is decreased to approach the BDC, is performed to increase the intake air amount in the cylinder to thereby secure the startability. Here, in the embodiment, the valve timing after stopping of the engine is controlled to be the valve timing for the engine starting during engine stopping process in which the ignition switch is turned off to stop the engine, in order to achieve the valve timing for the engine starting from the start of cranking.

In this manner, even though the crankshaft rotates in the reverse direction just before stopping of the engine as described above when the valve timing of intake valve 105 is changed by electric VTC 113 during the engine stopping process, the crank angle position (the piston position) can be detected with high accuracy.

Meanwhile, in the system in which the number of generations of rotation signal POS is counted and detected until the cam signal (the first cam signal in the cylinder in which a plurality of signals are output) is output from the reference crank angle position described above, the rotation phase (the valve timing of intake valve 105) of intake camshaft 134, which is changed by electric VTC 113, is not able to be correctly detected in the case of reverse rotation because a cam signal to be detected is misdetected.

Therefore, in the embodiment, in the feedback control of the valve timing during the engine stopping process, the manipulated variable of electric motor 12 of electric VTC 113 is converted from the manipulated variable for the feedback control to the hold manipulated variable to hold the rotation phase just before the detection of the reverse rotation when the reverse rotation of crankshaft 120 is detected based on rotation signal POS from crank angle sensor 117.

Hereinafter, each embodiment of the valve timing control of intake valve 105 is described.

FIG. 13 illustrates a flow of the first embodiment.

In Step 1, it is determined whether a stop command of the engine is output based on OFF operation of the ignition switch.

When a determination is made that the stop command is not output, in Step 2, based on the engine driving state, a VTC target angle θtrg, in other words, a target rotation angle (the VTC target angle θtrg) of intake camshaft 134 which is relatively rotated with respect to crankshaft 120 by electric VTC 113, specifically, a target rotation phase (a target valve timing of intake valve 105) of intake camshaft 134 is calculated.

Here, when the mirror cycle operation is performed considering the mileage in the low and middle loads, the VTC target angle θtrg is set to the target valve timing for the mirror cycle drive illustrated in FIG. 12A.

In Step 3, similarly a real rotation angle (a VTC real angle) θr of intake camshaft 134 which is rotated by the electric VTC 113, in other words, the rotation phase (the real valve timing of intake valve 105) of intake camshaft 134 is calculated.

As described above, by counting the number of generations of rotation signal POS from the reference crank angle position, which is detected by the signal from crank angle sensor 117 in every cylinder, to one single cam signal PHASE for each cylinder or the first signal of a plurality of cam signals PHASE output in succession, VTC real angle θr can be calculated.

In Step 4, the VTC manipulated variable of the feedback control (PI, PID control, or the like), which converges VTC real angle θr to VTC target angle θtrg is calculated.

Meanwhile, when in Step 1, it is determined that the engine stop command is output by the OFF operation of the ignition switch or the like, the control for converging to the valve timing for the engine starting during the engine stopping process is performed after Step 5.

In Step 5, VTC target angle θtrg is changed and set to the target valve timing which is advanced for the start of intake valve 105 illustrated in FIG. 12B.

In Step 6, it is determined that the engine stops by the fact that the rotation signal POS is not input from crank angle sensor 117 within a predetermined time or the like.

When it is determined that the engine is not yet stopped, the rotation direction of the engine (crankshaft 120) is determined using the determination method described above in Step 7.

Thus, in a case in which it is determined that the engine is normally rotated, the process proceeds to Step 8 and VTC real angle θr is detected in Step 8. In Step 9, the manipulated variable (VTC manipulated variable) of electric VTC 113 (electric motor 12) in the feedback control which converges VTC real angle θr to VTC target angle θtrg is calculated.

Meanwhile, in a case in which it is determined that the engine is reversely rotated in Step 7, the process proceeds to Step 10. In Step 10, the VTC manipulated variable is set to the hold manipulated variable in order to hold VTC real rotation angle θr (the real valve timing of intake valve 105) at VTC real rotation angle Or detected just before the reverse rotation is detected. In addition, during the rotation of the engine, a force relatively rotates intake camshaft 134 with respect to crankshaft 120, in other words, a force which changes the rotation phase acts due to a reaction force of the cam generated when intake valve 105 is opened and closed mainly by a valve spring. Therefore, motor shaft 13 of electric VTC 113 is held (the rotation of motor shaft 13 is stopped with respect to the motor main body) to suppress the relative rotation of intake camshaft 134 with respect to crankshaft 120, in other words, the change of the rotation phase. Accordingly, the rotation phase can be held in the current condition. Thus, the hold manipulated variable is set to a value which provides electric motor 12 with a holding force for holding motor shaft 13 to hold the rotation phase in the current condition.

In a case in which it is determined that the engine stops in Step 6, the drive of electric VTC 113 is stop (the manipulated variable=0) in Step 11. Since the cam reaction force does not occur after the engine stops, even though the drive of electric VTC 113 is stopped, the rotation of intake camshaft 134 is prevented by the frictional resistance of reducer 8 or the like and the valve timing of intake valve 105 is held as is.

In addition, in a case in which the engine returns to the forward rotation again after the engine rotates in reverse, the process proceeds to Step 8 again. The VTC manipulated variable for the feedback control, which converges VTC real angle $\theta r$ to VTC target angle $\theta trg$ while detecting VTC real angle $\theta r$, is calculated and thereby the feedback control is restarted so that VTC real angle $\theta r$ approaches VTC target angle $\theta trg$ (the target valve timing for the engine starting).

According to the first embodiment, even though the reverse rotation of crankshaft 120 occurs during engine stopping process, the feedback control is performed in which the valve timing of intake valve 105 after the engine stops has a target value of the valve timing for the engine starting until just before the reverse rotation occurs. Accordingly, it is able to approach as close as possible the valve timing for the engine starting advanced from the valve timing for the mirror cycle or the like before the stop command of the engine.

Accordingly, during next starting of the engine, the valve timing can be converged as soon as possible from the valve timing during stopping to the valve timing for the engine starting, thereby improving the startability.

Figure 18:
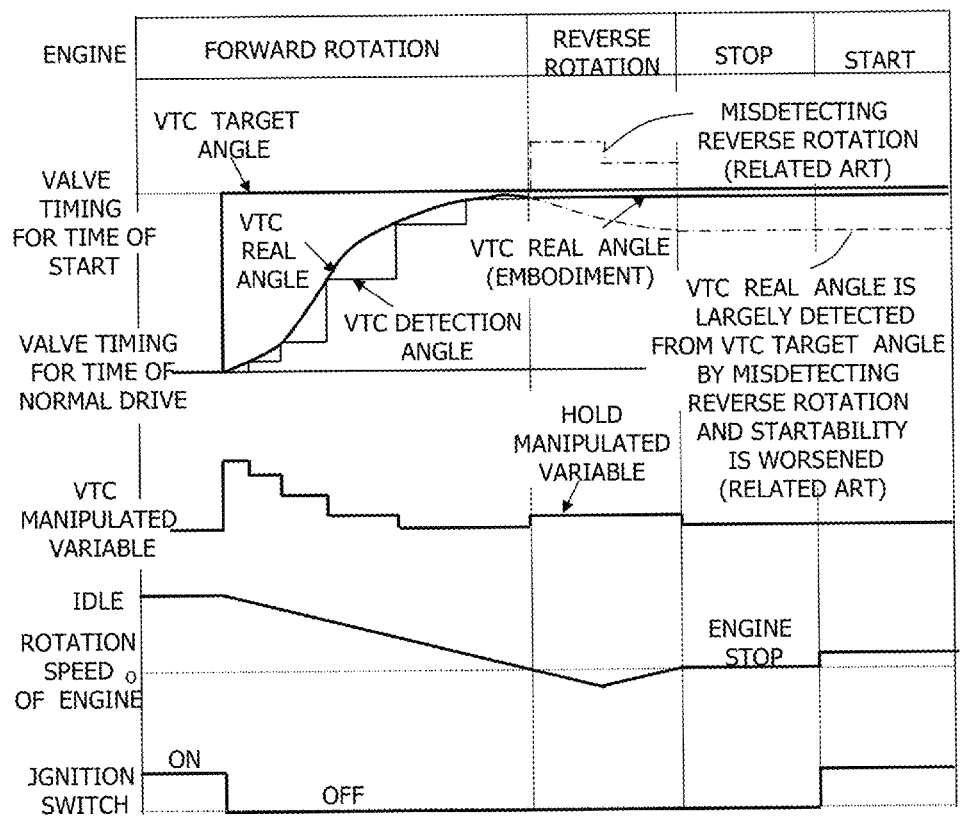
FIG. 18 is a time chart illustrating change of various states in valve timing control of an intake valve during engine stopping process in each of the embodiments.

FIG. 18 illustrates a time chart during control of the first embodiment. Conventionally, as illustrated in a one dot chain line, when the VTC real angle is misdetected due to the reverse rotation, the VTC real angle (the valve timing) after the engine stops largely deviates from the VTC target angle (the valve timing for the engine starting) by which the startability turns worse. In contrast, in the embodiment indicated by a solid line, VTC real angle $\theta r$ is held in a state where the valve timing after the engine stops is close to the valve timing for the engine starting without misdetecting the VTC real angle during the reverse rotation, and then the start (the cranking) is able to be performed from this state.

Figure 14:
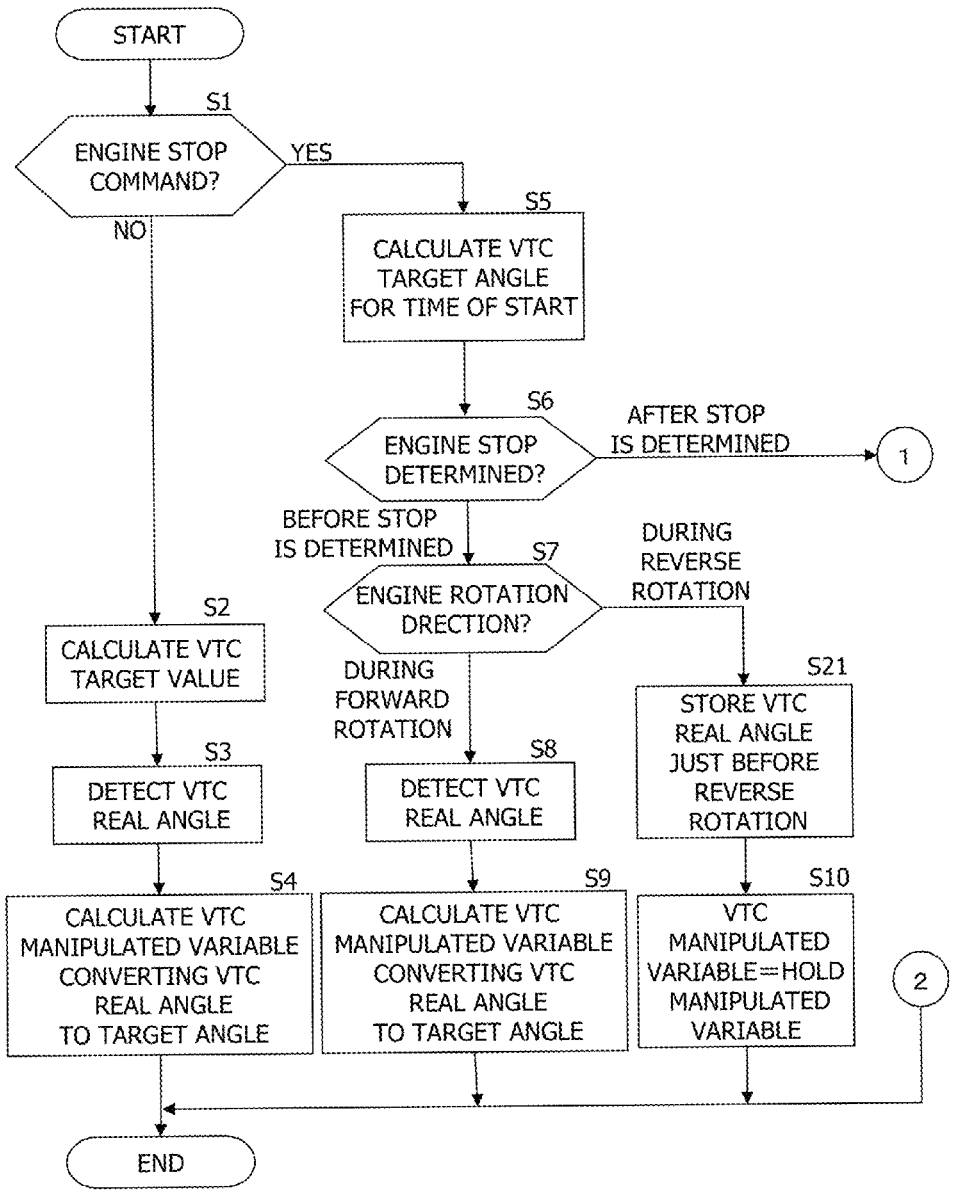
FIG. 14 is a view illustrating a first half of a flowchart of a second embodiment of valve timing control of an intake valve by the variable valve timing mechanism.
Figure 15:
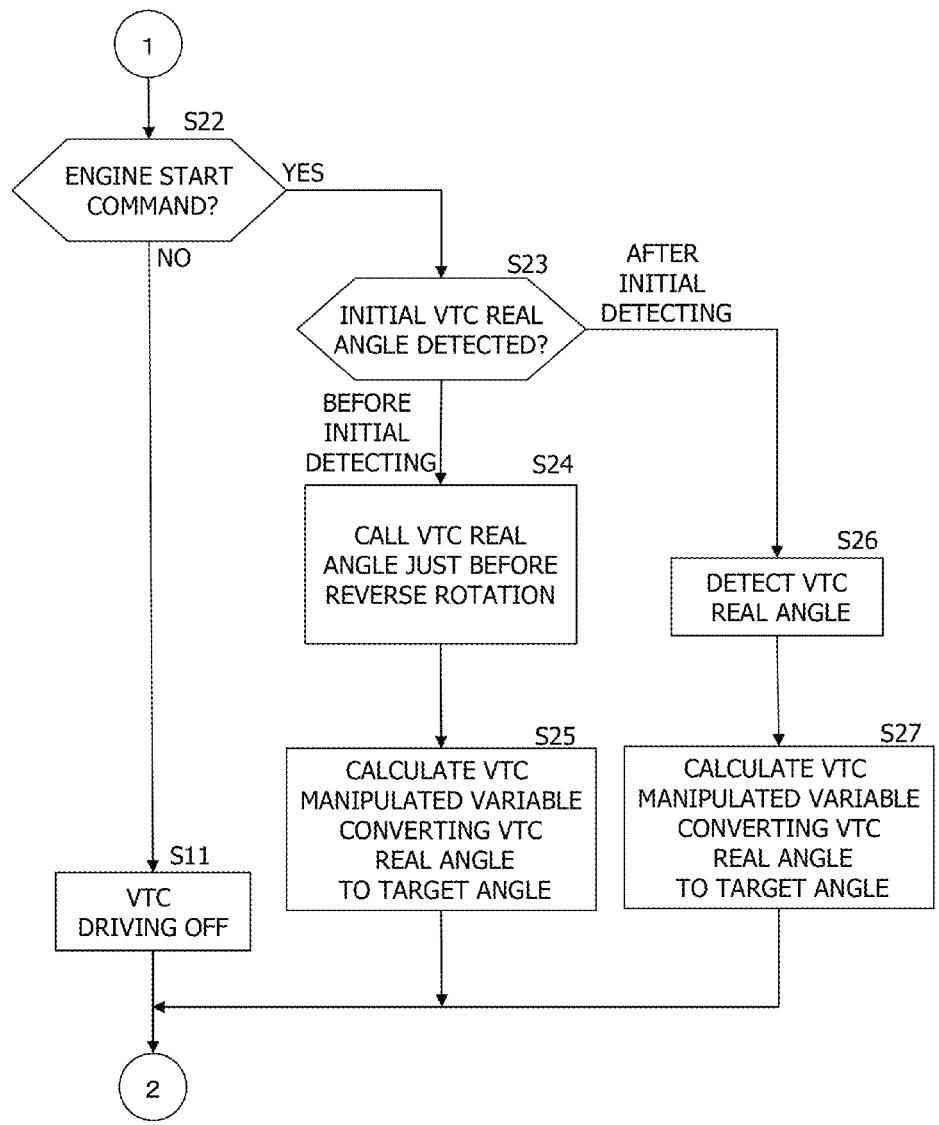
FIG. 15 is a view illustrating a second half of the flowchart of the second embodiment.

FIGS. 14 and 15 illustrate flows of the second embodiment of the valve timing control of intake valve 105.

Basic configuration is similar to FIG. 13 of the first embodiment and therefore difference (addition) portions are mainly described.

In FIG. 14, when the reverse rotation is determined in Step 7, before the hold manipulated variable of electric VTC 113 is calculated in Step 10, VTC real angle $\theta r$ is stored just before the reverse rotation in Step 21. Then, at the next starting, the control of the valve timing, described below, is performed using the above stored VTC real angle $\theta r$.

After it is determined that the engine is stopped in Step 6, the process proceeds to Step 22 and it is determined whether or not a start command of the engine is present. When the start command is not present, the drive of electric VTC 113 is stopped in Step 11 similarly to the first embodiment.

When it is determined that the start command of the engine is present in Step 22, the process proceeds to Step 23 to determine whether the initial VTC real angle $\theta r$ is detected (the cam signal PHASE for the detection of VTC real angle $\theta r$ is detected) after the start (cranking).

Thus, when it is determined that the initial VTC real angle $\theta r$ is not detected yet, VTC real angle $\theta r$ stored in Step 21 is called in Step 24. In Step 25, the called VTC real angle $\theta r$ is considered to be the initial detected value and the VTC manipulated variable, which is converged to VTC target angle $\theta trg$ for starting, is calculated to start the feedback control of the valve timing.

At this time, the VTC manipulated variable is set to a larger (smaller) value as deviation (=trg−$\theta r$) between VTC target angle $\theta trg$ and VTC real angle $\theta r$ is larger (smaller) so as to suppress overshooting and to achieve a quick convergence.

In addition, until initial VTC real angle $\theta r$ is detected, the VTC manipulated variable may be simply a constant value. If, however, the initial value of the VTC manipulated variable is set to a large value and the characteristic is set such that the VTC manipulated variable is decreased gradually every control period, function of suppressing overshooting is enhanced and the convergence performance increases.

If it is determined that the initial detection for the VTC real angle $\theta r$ has been made (cam signal PHASE for detecting VTC real angle $\theta r$ has been detected) in step 23, VTC real angle $\theta r$ is detected in Step 26. In Step 27, a calculation is made to determine the VTC manipulated variable of the feedback control for converging the detected VTC real angle $\theta r$ to VTC target angle $\theta trg$.

According to the second embodiment, after output of the start command, the feedback control is able to start using VTC real angle $\theta r$ which is stored just before the reverse rotation of the engine since before initial VTC real angle $\theta r$ is detected. Accordingly, the startability is able to be improved while the valve timing of intake valve 105 is converged to the target valve timing for the engine starting more quickly.

Figure 16:
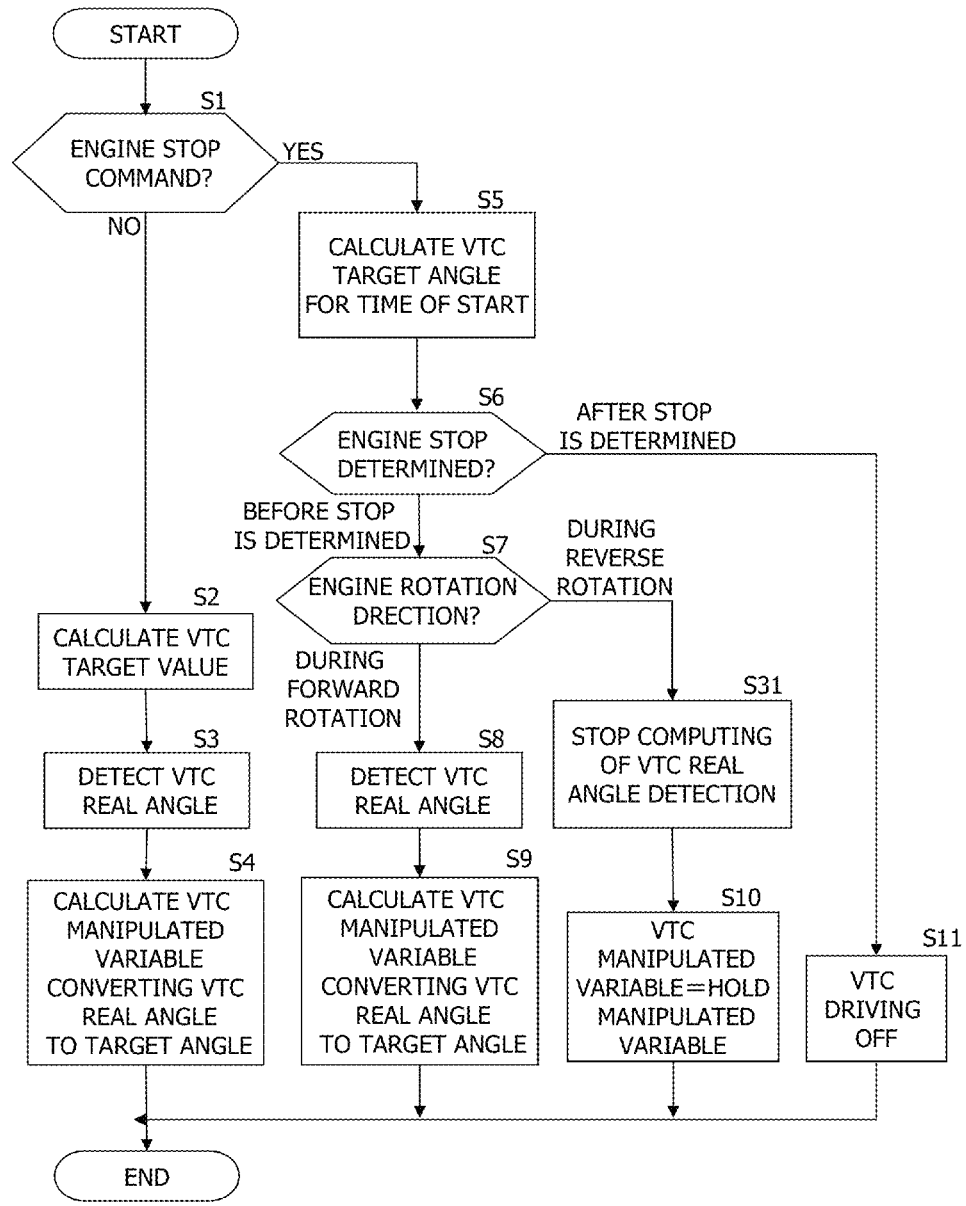
FIG. 16 is a flowchart of a third embodiment of valve timing control of an intake valve by the variable valve timing mechanism.

FIG. 16 illustrates a flow of a third embodiment of control of the valve timing of intake valve 105.

In the third embodiment, in the configuration similar to FIG. 13 of the first embodiment, the computation of VTC real angle $\theta r$ is stopped in Step 31 when the reverse rotation of the engine is detected in Step 7.

According to the third embodiment, unneeded computation is stopped during the reverse rotation of the crankshaft where VTC real angle $\theta r$ is not able to be correctly calculated and thereby computation load is able to decrease.

Figure 17:
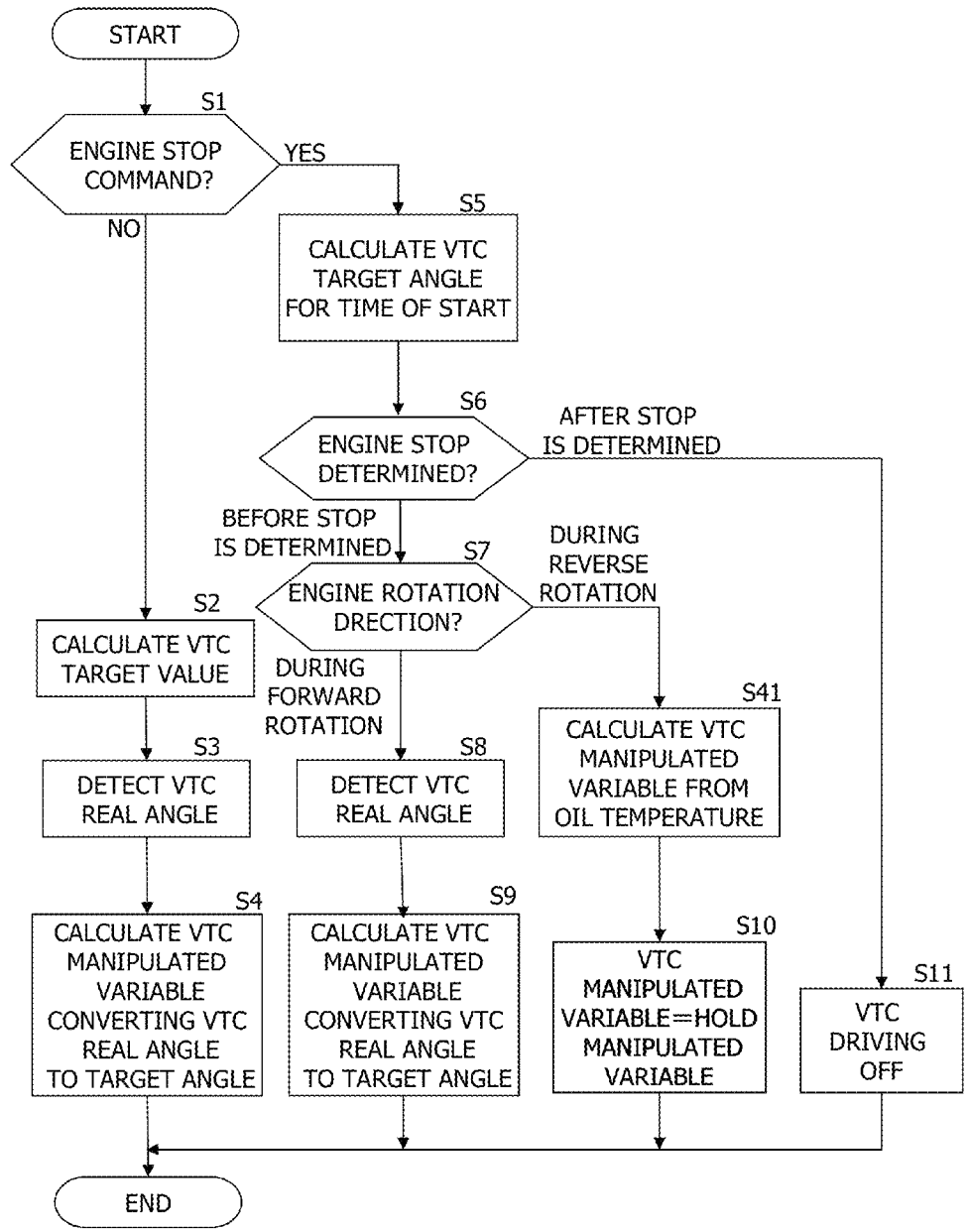
FIG. 17 is a flowchart of a fourth embodiment of valve timing control of an intake valve by the variable valve timing mechanism.

FIG. 17 illustrates a flow of a fourth embodiment of control of the valve timing of intake valve 105.

In the fourth embodiment, in the configuration similar to FIG. 13 of the first embodiment, when the reverse rotation of the engine is detected in Step 7, the hold manipulated variable for holding the hold manipulated variable at the VTC real angle $\theta r$ detected just before detecting the reverse rotation is calculated as a variable value based on the temperature of the lubricant (the oil temperature) and the rotation speed of the engine in Step 41.

Specifically, when the oil temperature is low and the viscosity of the lubricant is high, the frictional resistance of reducer 8 or the like increases and thereby the hold manipulated variable is able to be corrected to be smaller. When the rotation speed of the engine is high, the frequency of generations of the cam reaction force increases and camshaft 134 is easily relatively rotated, and therefore the hold manipulated variable is corrected to be a larger value.

According to the fourth embodiment, the hold manipulated variable is set to be a necessary and sufficient value and thereby power consumption is able to be reduced while securing the holding force.

In addition, it goes without saying that there may be an embodiment in which Step 31 of the third embodiment and Step 41 of the fourth embodiment are provided at the same time between Step 7 and Step 11. It goes without saying that in the second embodiment, at least one of Step 31 and Step 41 may be included between Step 7 and Step 11.

In addition, in the embodiments described above, electric VTC 113 has a structure in which the main body of electric motor 12 integrally rotates with timing sprocket 1, and a large frictional resistance is held by interposing reducer 8 having large reduction ratio between motor shaft 13 and intake camshaft 134. Accordingly, the large holding force of motor shaft 13 is also provided only by the frictional resistance, and therefore it is required to provide only the hold manipulated variable to offset the shortage by the holding force caused by the frictional resistance, by which power consumption can be reduced. In addition, in a case in which a configuration is made such that only the frictional resistance is able to secure the holding force which is able to suppress the relative rotation of motor shaft 13 by the cam reaction force, the hold manipulated variable is able to be set to zero (the drive of electric VTC is stopped). In the electric VTC of this type, the hold manipulated variable is also maintained when the valve timing is not changed during normal operation, and only when the valve timing is changed, the motor shaft is driven to rotate.

In contrast, in a case of the structure of the electric VTC, for example, as disclosed in Japanese Patent No. 4123127 in which the stator of the electric motor is fixed to the cover, the rotation speed of the electric motor is adjusted to increase and decrease, with respect to the rotation speed (the rotation speed which holds the valve timing) of the motor shaft which rotates the camshaft in the same speed as the sprocket, to change the valve timing, and therefore the electric motor needs to be driven always at a high speed.

Accordingly, power consumption of the electric motor is able to be greatly reduced by employing the structure of the embodiments in which the motor shaft is driven only when the valve timing is changed compared to Japanese Patent No. 4123127. However, the present invention includes a configuration which is applied to the electric VTC of the structure of Japanese Patent No. 4123127.

In addition, in the electric VTC in which the valve timing of the exhaust valve is changed by the electric motor, the present invention is also applicable to the exhaust valve which is controlled to an appropriate valve timing during the engine stopping process or the like. Also in this case, during occurrence of reverse rotation, the valve timing of the exhaust valve after the stop is held to be close to the valve timing for the engine starting and thereby the startability in the next start is able to be improved.

The entire contents of Japanese Patent Application No. 2011-212730, filed Sep. 28, 2011, are incorporated herein by reference.

While only a select embodiment have been chosen to illustrate the present invention, it will be apparent to those skilled in the art from this disclosure that various change and modification can be made herein without departing from the scope of the invention as defined in the appended claims.

Furthermore, the foregoing description of the embodiments according to the present invention is provided for illustration only, and not for the purpose of limiting the invention, the invention as claimed in the appended claims and their equivalents.

What is claimed is:

1. A control device of a variable valve timing mechanism in an internal combustion engine, comprising:
    a crank angle sensor which detects a rotation angle of a crankshaft;
    a cam sensor which detects a rotation angle of a camshaft for opening and closing an engine valve;
    a rotation phase detection unit which detects a rotation phase of the camshaft with respect to the crankshaft based on each signal from the crank angle sensor and the cam sensor;
    an actuator which relatively rotates the camshaft with respect to the crankshaft and is configured to change the rotation phase;
    a forward rotation and reverse rotation detection unit which determines and detects forward rotation and reverse rotation of the crankshaft; and
    a control unit which controls driving of the actuator and converts a manipulated variable of the actuator into a hold manipulated variable where the rotation phase is controlled to hold a current condition when the reverse rotation of the crankshaft is detected.

2. The control device of the variable valve timing mechanism in the internal combustion engine according to claim 1, wherein the control unit controls the rotation phase after stopping of the engine to approach a target rotation phase for a time of starting the engine based on the rotation phase which is detected by the rotation phase detection unit from a time when engine stopping is started to a time when the engine is stopped.

3. The control device of the variable valve timing mechanism in the internal combustion engine according to claim 1, wherein the control unit operates the actuator based on the rotation phase which is held by using the hold manipulated variable during a period from generation of an engine start command to detection of an initial rotation phase by the rotation phase detection unit.

4. The control device of the variable valve timing mechanism in the internal combustion engine according to claim 1, wherein the control unit controls the rotation phase of the camshaft for opening and closing an intake valve so that a closing timing of the intake valve is in a retard angle side from an intake bottom dead center before the engine is operated to be stopped, and controls the rotation phase so that a closing timing of the intake valve is in an advanced angle side from a closing timing before the engine stopping is started to approach the intake bottom dead center.

5. The control device of the variable valve timing mechanism in the internal combustion engine according to claim 1, wherein the control unit calculates the hold manipulated variable based on a rotation speed of the engine and a temperature of the engine during generation of reverse rotation of the crankshaft.

6. The control device of the variable valve timing mechanism in the internal combustion engine according to claim 1, wherein the control unit stops a computation of detection of the rotation phase by the rotation phase detection unit when the reverse rotation of the crankshaft is detected, and restarts the computation of the detection of the rotation phase by the rotation phase detection unit when the forward rotation of the crankshaft is detected again.

7. The control device of the variable valve timing mechanism in the internal combustion engine according to claim 1, wherein the control unit stops the driving of the actuator after stopping of the engine.

8. The control device of the variable valve timing mechanism in the internal combustion engine according to claim 1, wherein the control unit sets a target rotation phase of an intake valve as the engine valve to a value for a mirror cycle operation during normal driving after starting of the engine, and sets the target rotation phase for the engine starting to a value closer to an intake bottom dead center than the target rotation phase during normal driving after the starting of the engine.

9. The control device of the variable valve timing mechanism in the internal combustion engine according to claim 1, wherein:
the camshaft and a sprocket rotating with the crankshaft are arranged concentrically;
the actuator is configured such that the sprocket, the camshaft, and a motor shaft of the variable valve timing mechanism are arranged concentrically, and a motor main body of the variable valve timing mechanism including a stator is composed of an electric motor integrally rotating with the sprocket; and
the control unit transmits rotation of the motor shaft to the camshaft via a reducer, so that the camshaft is relatively rotated with respect to the sprocket to change the rotation phase.

10. A control device of a variable valve timing mechanism in an internal combustion engine, comprising:
crankshaft rotation angle detecting means for detecting a rotation angle of a crankshaft;
camshaft rotation angle detecting means for detecting the rotation angle of a camshaft for opening and closing an engine valve;
rotation phase detecting means for detecting a rotation phase of the camshaft with respect to the crankshaft based on signals from the crankshaft rotation angle detecting means and the camshaft rotation angle detecting means;
an actuator which relatively rotates the camshaft with respect to the crankshaft and is configured to change the rotation phase;
forward rotation and reverse rotation detecting means for determining and detecting forward rotation and reverse rotation of the crankshaft; and
control means for driving the actuator and converting a manipulated variable of the actuator into a hold manipulated variable with which the rotation phase is controlled to hold a current condition when the reverse rotation of the crankshaft is detected.

11. A method for controlling a variable valve timing mechanism in an internal combustion engine, comprising:
detecting a rotation angle of a crankshaft and a rotation angle of a camshaft for opening and closing an engine valve;
detecting a rotation phase of the camshaft with respect to the crankshaft based on each signal of the rotation angle of the crankshaft and the rotation angle of the camshaft for opening and closing the engine valve;
changing the rotation phase of the camshaft by driving an actuator and relatively rotating the camshaft with respect to the crankshaft;
determining and detecting forward rotation and reverse rotation of the crankshaft; and
controlling driving of the actuator and converting a manipulated variable of the actuator into a hold manipulated variable with which the rotation phase is controlled to hold a current condition when the reverse rotation of the crankshaft is detected.

12. The method for controlling the variable valve timing mechanism in the internal combustion engine according to claim 11,
wherein controlling driving of the actuator further includes controlling the rotation phase after stopping of the engine to approach a target rotation phase for a time of starting the engine based on the rotation phase which is detected from a time when engine stopping is started to a time when the engine is stopped.

13. The method for controlling the variable valve timing mechanism in the internal combustion engine according to claim 11,
wherein controlling driving of the actuator further includes operating the actuator based on the rotation phase which is held by using a hold manipulated variable during a period from generation of an engine start command to detection of an initial rotation phase.

14. The method for controlling the variable valve timing mechanism in the internal combustion engine according to claim 11, wherein controlling driving of the actuator further includes:
controlling the rotation phase of the camshaft for opening and closing an intake valve so that a closing timing of the intake valve is in a retard angle side from an intake bottom dead center before the engine is operated to be stopped, and
controlling the rotation phase so that the closing timing of the intake valve is in an advanced angle side from a closing timing before engine stopping is started to approach the intake bottom dead center.

15. The method for controlling the variable valve timing mechanism in the internal combustion engine according to claim 11,
wherein controlling driving of the actuator further includes calculating the hold manipulated variable based on a rotation speed of the engine and a temperature of the engine during generation of reverse rotation of the crankshaft.

16. The method for controlling the variable valve timing mechanism in the internal combustion engine according to claim 11,
wherein controlling driving of the actuator further includes stopping a computation of detection of the rotation phase when the reverse rotation of the crankshaft is detected, and restarting the computation of the detection of the rotation phase when the forward rotation of the crankshaft is detected again.

17. The method for controlling the variable valve timing mechanism in the internal combustion engine according to claim 11,
wherein controlling driving of the actuator further includes stopping the driving of the actuator after stopping of the engine.

18. The method for controlling the variable valve timing mechanism in the internal combustion engine according to claim 11, wherein controlling driving of the actuator further includes:
setting a target rotation phase of an intake valve as the engine valve during normal driving after starting of the engine to a value for a mirror cycle operation, and
setting the target rotation phase for the starting of the engine to a value closer to an intake bottom dead center than the target rotation phase during normal driving after the starting of the engine.

19. The method for controlling the variable valve timing mechanism in the internal combustion engine according to claim 11, wherein:
the camshaft and a sprocket rotating with the crankshaft are arranged concentrically;
the actuator is configured such that a sprocket, the camshaft, and a motor shaft of the variable valve timing mechanism are arranged concentrically, and a motor main body of the variable valve timing mechanism including a stator is composed of an electric motor integrally rotating with the sprocket; and controlling driving of the actuator further includes changing the rotation phase by transmitting rotation of the motor shaft to the camshaft via a reducer and relatively rotating the camshaft with respect to the sprocket.

* * * * *